(12) United States Patent
Lee et al.

(10) Patent No.: US 12,409,458 B2
(45) Date of Patent: Sep. 9, 2025

(54) AIR PURIFICATION FILTER AND AIR PURIFIER INCLUDING SAME

(71) Applicant: LG ELECTRONICS INC., Seoul (KR)

(72) Inventors: Jung Ryun Lee, Seoul (KR); Seung Jae Baeck, Seoul (KR); Ok Chun Hyun, Busan (KR); Chul Woo Park, Busan (KR)

(73) Assignee: LG ELECTRONICS INC., Seoul (KR)

( * ) Notice: Subject to any disclaimer, the term of this patent is extended or adjusted under 35 U.S.C. 154(b) by 600 days.

(21) Appl. No.: 17/776,713

(22) PCT Filed: Nov. 17, 2020

(86) PCT No.: PCT/KR2020/016189
§ 371 (c)(1),
(2) Date: May 13, 2022

(87) PCT Pub. No.: WO2021/101218
PCT Pub. Date: May 27, 2021

(65) Prior Publication Data
US 2022/0401964 A1 Dec. 22, 2022

(30) Foreign Application Priority Data
Nov. 18, 2019 (KR) .......................... 10-2019-0148118

(51) Int. Cl.
*B03C 3/09* (2006.01)
*B03C 3/70* (2006.01)

(52) U.S. Cl.
CPC . *B03C 3/09* (2013.01); *B03C 3/70* (2013.01)

(58) Field of Classification Search
CPC .... B03C 3/09; B03C 3/70; B03C 3/47; B01D 2239/0478; B01D 2239/0241; B01D 2239/065; B01D 46/0032; F24F 8/192
(Continued)

(56) References Cited

U.S. PATENT DOCUMENTS

| 4,886,526 A | 12/1989 | Joannou |
| 4,978,372 A | 12/1990 | Pick |

(Continued)

FOREIGN PATENT DOCUMENTS

| CA | 1319624 C | * 3/1993 | ............. B03C 3/155 |
| CN | 1542371 | 11/2004 | |

(Continued)

OTHER PUBLICATIONS

Chinese Office Action dated Feb. 15, 2023 issued in Application No. 202080079421.1.

(Continued)

*Primary Examiner* — Qianping He
(74) *Attorney, Agent, or Firm* — KED & ASSOCIATES, LLP

(57) ABSTRACT

Proposed are an air purification filter (1) and an air purifier (200) including the same. The air purification filter includes a filtering layer (30) configured as a dielectric which collects minute particles, a pair of electrode layers (50, 70) laminated on opposite sides of the filtering layer (30), respectively, and configured to receive power so as to generate polarization through an electric field in the filtering layer (30), and a connection module (100, 100'). The connection module (100, 100') is coupled to at least any one of the opposite ends of the pair of electrode layers (50, 70) such that the coupled portion of the connection module is insulated from an outside thereof and is electrically connected with an external power supply part.

20 Claims, 13 Drawing Sheets

(58) Field of Classification Search
USPC .............................................................. 96/8
See application file for complete search history.

(56) References Cited

U.S. PATENT DOCUMENTS

2010/0326279 A1    12/2010  Wiser et al.
2017/0120256 A1*    5/2017  Jeon .......................... B03C 3/60
2019/0126176 A1     5/2019  Kaukopaasi et al.

FOREIGN PATENT DOCUMENTS

| CN | 102177602       |   | 9/2011  |
|----|-----------------|---|---------|
| JP | 2009066027      |   | 4/2009  |
| KR | 10-2004-0075448 |   | 8/2004  |
| KR | 10-0496920      |   | 6/2005  |
| KR | 10-2010-0082025 |   | 7/2010  |
| KR | 10-2011-0128465 |   | 11/2011 |
| KR | 20120126628     |   | 11/2012 |
| KR | 10-1306966      |   | 9/2013  |
| KR | 10-2013-0125040 |   | 11/2013 |
| KR | 20130125040     |   | 11/2013 |
| KR | 20130125040 A   | * | 11/2013 |
| KR | 10-2019-0006208 |   | 1/2019  |
| KR | 10-2019-0068327 |   | 6/2019  |

OTHER PUBLICATIONS

International Search Report dated Mar. 3, 2021 issued in Application No. PCT/KR2020/016189.
Extended European Search Report dated Nov. 23, 2023 issued in Application No. 20891356.6.

* cited by examiner

AIR PURIFICATION FILTER AND AIR PURIFIER INCLUDING SAME

CROSS-REFERENCE TO RELATED PATENT APPLICATIONS

This application is a U.S. National Stage Application under 35 U.S.C. § 371 of PCT Application No. PCT/KR2020/016189, filed Nov. 17, 2020, which claims priority to Korean Patent Application No. 10-2019-0148118, filed Nov. 18, 2019, whose entire disclosures are hereby incorporated by reference.

TECHNICAL FIELD

The present disclosure relates generally to an air purification filter and an air purifier. More particularly, the present disclosure relates to an air purification filter in which electrostatic force is activated by applying high voltage to the filter, and to an air purifier to which such a filter is mounted.

BACKGROUND ART

An air purifier is understood as a device that sucks in and purifies polluted air, and then discharges the purified air. For example, an air purifier may include a blower which introduces external air into the air purifier, and filters which can filter out dust and bacteria in the air.

Among these filters, a dielectric filter is electrostatically treated during manufacturing so as to have electrostatic property. The filter treated electrostatically in this manner can electrically adsorb minute particles and thus can have a lower pressure loss and higher collection efficiency than a conventional mechanical filter.

In general, particles suspended in air contain a lot of positively or negatively charged particles, and the charged particles are strongly adsorbed to a dielectric filter which is electrostatically treated, so the collection efficiency of the filter is increased.

However, as the usage time of the filter is accumulated and the collected dust increases, the loss of electrostatic force occurs, and the collection efficiency of the filter also decreases. Accordingly, even if a filter is electrostatically treated, the filter has limited collection efficiency due to increase in usage time thereof.

Particularly, indoor air may contain multiple oil particles, and a general air purifier has a problem in that the air purifier is difficult to effectively remove oil particles contained in air. When oil particles are collected in a filter installed to remove foreign matter, an electrostatic property of the filter is rapidly reduced and the life of the filter is rapidly reduced.

In order to solve this, a filter may be used in which a power supply is connected to the filter, and an electrostatic field generated by a voltage differential between two electrodes is used. In this case, a dielectric filter is located in the electrostatic field between the two electrodes and performs a collection function.

Among prior arts, there is an art (Korean Patent Application Publication No. 10-2011-0128465) in which a porous electrode is used to impart electrostatic properties to a dielectric filter, and voltages of different polarities are applied to end parts of the electrodes of the opposite sides of a thin filter. However, different polarities are applied to the opposite surfaces of the thin filter, and an insulation distance therebetween is very short, and thus current flows therebetween, so there is the risk of an insulation performance decrease and a fire.

Particularly, in prior arts in which electrostatic properties are imparted to a dielectric filter, when the filter is rolled to have a cylindrical shape, opposite ends thereof in contact with each other may be energized, so it is difficult to make the filter cylindrical.

In addition, there is a disclosed prior art (Korean Patent Application Publication No. 10-2010-0082025) in which without bending a filter, multiple straight filters are connected to each other to provide a V-shaped filter module. However, a power supply structure is very complicated since a high voltage is required to be applied to each of V-shaped electrodes.

Furthermore, there is a disclosed prior art (Korean Patent Application Publication No. 10-2019-0068327) in which a filter is bent and installed between electrodes having shapes of flat screens on opposite sides. Since power is supplied to the bent end of the filter through wide flat screens, a very high voltage is required to form an electric field, and further, there is an inconvenience in that the filter is required to be installed in an air purifier by aligning the directions of two terminals for applying power.

DISCLOSURE

Technical Problem

The present disclosure has been made to solve the above problems occurring in the prior art, and the present disclosure is intended to ensure that two electrodes are stably insulated therebetween through a connection module even if the two electrodes are close to each other due to thin thickness of a filter.

The present disclosure is further intended to ensure that power is evenly supplied to an entire filter through the connection module.

The present disclosure is still further intended to ensure that the filter may be mounted in various directions with no limit to a direction when the filter is mounted to an air purifier.

Technical Solution

In order to accomplish the above objectives, according to an aspect of the present disclosure, an air purification filter of the present disclosure includes a filtering layer configured as a dielectric which collects minute particles, a pair of electrode layers laminated respectively on opposite sides of the filtering layer and configured to receive power so as to generate polarization through an electric field in the filtering layer, and a connection module. The connection module may be coupled to at least any one of the opposite ends of the pair of electrode layers such that the coupled portion of the connection module is insulated from the outside, and the coupled portion is electrically connected with an external power supply part. Accordingly, the connection module may be coupled to at least any one end part of the pair of electrode layers, and thus a part of an insulator, which is exposed to the outside, of the at least any one end part of the pair of electrode layers may be electrically connected to the power supply part, and a remaining part thereof may be insulated from the outside, and particularly, even if two electrodes are close to each other due to thin thickness of the filter, the connection module may realize complete insulation between the two electrodes.

In addition, connection end parts of conductors exposed to the outside may be provided on the electrode layer such that the each of connection end parts thereof is electrically connected to the power supply part, and the connection module may be coupled to the electrode layer so as to cover the connection end part. Accordingly, power may be supplied simultaneously to the conductors of the electrode layer from various positions, and the filter may realize an even performance.

In addition, the connection module may include a module housing having a connection space defined therein and made of an insulated material, and a module terminal installed in the connection space of the module housing and electrically connected to any one of the pair of electrode layers inserted into the connection space, with a terminal head protruding toward the outside of the connection space and being connected to the power supply part. The protruding terminal head may be in contact with a connection terminal provided inside an air purifier so as to receive power.

In addition, in any one of the pair of electrode layers, a connection end part of a conductor thereof exposed to the outside may be seated in the connection space so as to be electrically connected to the module terminal, and in a remaining one of the pair of electrode layers, the connection end part of a conductor may be located at a position away from the connection space. That is, when the connection module is assembled with the end parts of the pair of electrode layers, any one electrode layer may be electrically connected to the module terminal of the connection module, but a remaining electrode layer may be located at a position away from the module terminal without being in contact therewith so as to be insulated therefrom.

The module terminal may be seated on the bottom of the connection space provided in the module housing of the connection module, and in any one electrode layer of the pair of electrode layers, the connection end part of a conductor may be laminated on the surface of the module terminal. Conductive paste may be applied between the module terminal seated in the connection space of the module housing and the connection end part of a conductor of any one of the pair of electrode layers laminated on the module terminal. Accordingly, electrical connection between the filter body and the connection module may be easily and stably performed.

The connection module may include a first connection module and a second connection module coupled respectively to the opposite sides of a filter body including the filtering layer and the pair of electrode layers, wherein the first connection module and the second connection module may be electrically connected respectively to a first electrode layer and a second electrode layer constituting the pair of electrode layers. Accordingly, both of the opposite sides of the filter body may be insulated from the outside and, simultaneously, may be electrically connected.

When the first connection module and the second connection module are coupled to the opposite sides of the filter body, respectively, a first terminal head protruding from the first connection module and a second terminal head protruding from the second connection module may protrude in directions opposite to each other. Furthermore, a first connection terminal and a second connection terminal corresponding to the second terminal head and the first terminal head, respectively, may be installed inside a mounting space of the air purifier, and an insulation distance may be sufficiently secured between two electrodes of the filter.

At least any one of the first electrode layer and the second electrode layer may be configured by interlacing multiple strands of insulated wires, and the first electrode layer may be configured by interlacing the multiple strands of insulated wires and multiple strands of support lines which are insulators, and the insulated wires and support lines of the first electrode layer may be woven together. Accordingly, the electrode layer may be configured by interlacing multiple strands of insulated wires, and as the insulated wires, wires, which are completely pre-insulated, such as enameled copper wires may be used, so the insulation performance of the filter may be improved and without need for an additional insulation work, the manufacturing of the filter may be facilitated.

According to another aspect of the present disclosure, the air purifier of the present disclosure may include a purifier housing having a filter installation space defined therein, a power supply part installed in the purifier housing, and a filter configured to receive power from the power supply part when installed in the filter installation space. In this case, the connection module may be installed on the filter, and the first connection terminal connected to the power supply part and the second connection terminal may be installed in the filter installation space, the second connection terminal being connected to the power supply part by having a polarity opposite to the polarity of the first connection terminal or being grounded. When the filter is installed in the filter installation space, the first connection module and the second connection module may be electrically connected to the second connection terminal and the first connection terminal, respectively. Accordingly, the mounting of the filter to the air purifier may be easy.

Furthermore, the filter may be formed by rolling the filter body including the filtering layer and the pair of electrode layers so as to have a cylindrical shape, and any one of the first connection terminal and the second connection terminal may be made along a virtual circular extension line drawn while the terminal head of the module terminal protruding from the connection module rotates relative to the center of the cylindrical filter. Accordingly, even if the filter is inserted into the mounting space in any direction, the terminal head may be in contact with and connected to the connection terminal, so there may be no limit to the insertion direction of the filter.

Advantageous Effects

The air purification filter and the air purifier including the same according to the present disclosure described above may have the following effects.

According to the present disclosure, when the pair of electrode layers receives power and an electric field is formed therebetween, the collection performance of the filtering layer located therebetween may be improved through dielectric polarization. In this case, the connection module may be coupled to at least any one end part of the pair of electrode layers such that an exposed part of an insulator thereof is electrically connected to the power supply part and a remaining part thereof is insulated from the outside. Accordingly, according to the present disclosure, the exposed end part of the insulator may be completely covered so as to securely insulate the electrode part of the filter, and particularly, even if two electrodes thereof are close to each other due to the thin thickness of the filter, the connection module may realize complete insulation between the two electrodes, thereby improving the insulation performance of the filter.

Furthermore, the connection module of the present disclosure may be coupled to an end part of the electrode layer, and may insulate the electrode layer, and accordingly, an insulated material is not required to be applied to the electrode layer for insulation thereof or it is not required to insulate end parts thereof which are easily energized, so the insulation work of the filter may be facilitated.

In addition, in the present disclosure, the connection module may be connected to at least one of the pair of electrode layers, and the connection module may be connected transversely to the connection end part of the exposed conductor of an end part of each of multiple electrode layers so as to energize the electrode layers. Accordingly, power may be supplied simultaneously to the conductors of the electrode layers from various positions, and the filter may realize even performance.

Furthermore, in the present disclosure, the connection module may include two housings having the module terminal made of a conductive material provided therebetween, and when an end part of each of the electrode layers constituting the filter is inserted into the housings, the end part thereof may be laminated on the module terminal so as to be electrically connected. Accordingly, in the process of assembling the housings constituting the connection module, the electrode layer and the connection module may be naturally electrically connected to each other, and the remaining part of the electrode layer may be insulated from the connection module, thereby facilitating the manufacturing of a power connection part for supplying power to the filter.

Additionally, in the present disclosure, the pair of electrode layers constituting the filter may be manufactured to have different lengths from each other, and the connection end parts of the conductors, which are exposed to the outside, on the end parts of the electrode layers may have positions different from each other. Accordingly, when the connection module is assembled with the end parts of the pair of electrode layers, any one electrode layer may be electrically connected to the module terminal of the connection module, but a remaining electrode layer may be located at a position away from the module terminal without being in contact therewith so as to be insulated therefrom, thereby improving insulation work of the filter and insulation thereof.

Accordingly, when the insulation of the filter is improved, a relatively large voltage may be applied to the electrode layer, and a filtering performance of the filtering layer may be improved, so even if fine dust particles are continuously attached and accumulated inside the filter, the activity of electrostatic force of the filter may be maintained to be constant. Furthermore, relative to the same efficiency of removing fine dust particles, the filter of the present disclosure may significantly reduce pressure loss, which is an air resistance characteristic, compared to an existing filter.

In addition, the connection module of the present disclosure may extend along one direction of the filter, and the terminal head connected to the module terminal may protrude to the outside of the housing of the connection module. Accordingly, when the connection module is mounted to the air purifier, the terminal head may be naturally in contact with the connection terminal provided inside the mounting space to be electrically connected thereto. Accordingly, the installation of the filter may be facilitated.

Particularly, in the first connection module and the second connection module electrically connected to the pair of electrode layers, respectively, the first terminal head and the second terminal head may protrude in directions opposite to each other, and in the mounting space of the air purifier, the first connection terminal and the second connection terminal corresponding to the second terminal head and the first terminal head, respectively, may be installed. Accordingly, an insulation distance may be sufficiently secured between the two electrodes of the filter.

In addition, in the present disclosure, the connection terminal which is circular may be installed inside the mounting space in which the filter is mounted, and such a connection terminal may be made along a virtual circular extension line drawn while the terminal head of the module terminal protruding from the connection module rotates relative to the center of the cylindrical shaped filter. Accordingly, even if the filter is inserted into the mounting space in any direction, the terminal head may be in contact with and connected to the connection terminal, and thus there may be no limit to the insertion direction of the filter, thereby improving the assembly of the filter.

Furthermore, the electrode layer may be configured by weaving multiple strands of insulated wires, and as the insulated wires, wires such as enameled copper wires which are completely pre-insulated may be used, thereby, improving the insulation performance of the filter, facilitating the manufacturing of the filter without need for an additional insulation work, and improving the performance of the filter due to improved conductivity.

Figure 5:
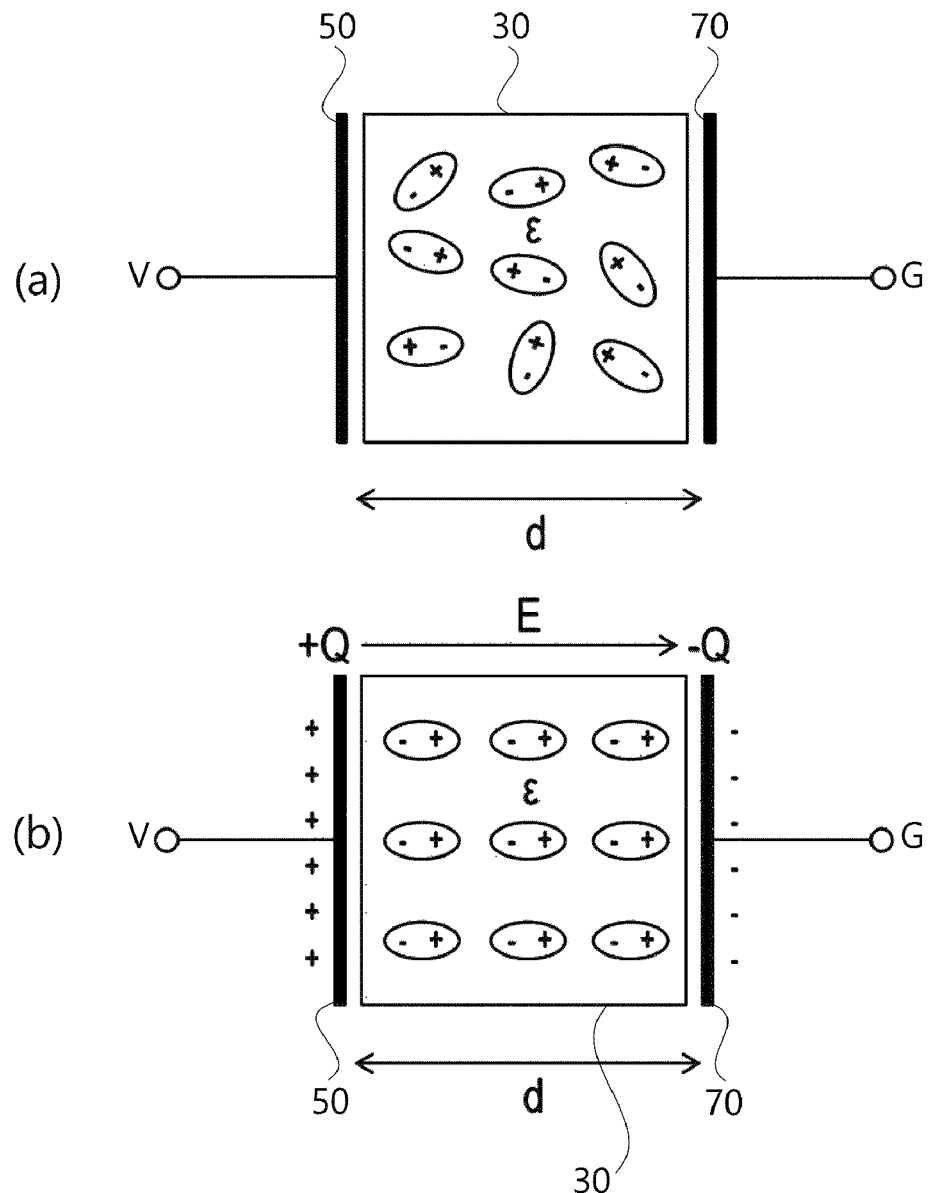

Sections (a) and (b) of FIG. 5 respectively are conceptual diagrams illustrating states before and after a filtering layer constituting the filter body of the present disclosure according to the embodiment is polarized.

Figure 6:
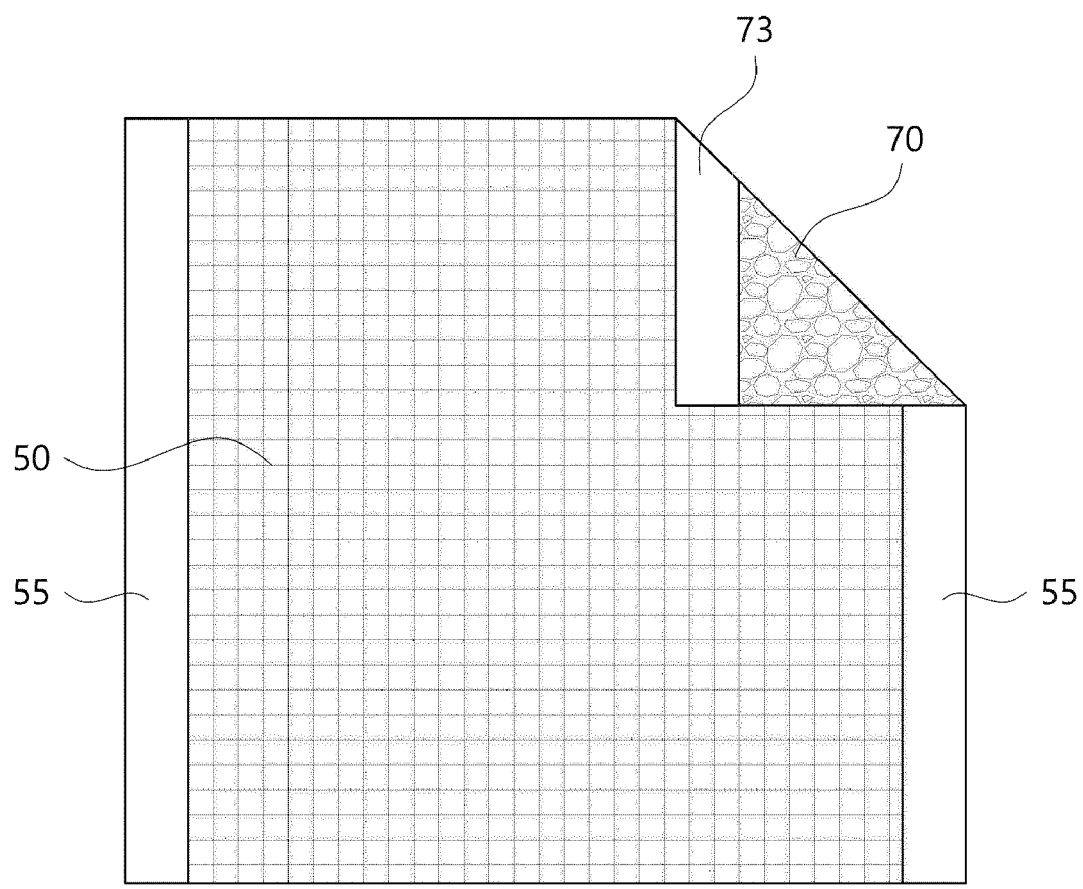

FIG. 6 is a top plan view illustrating another embodiment of the filter body of the present disclosure.

Figure 7:
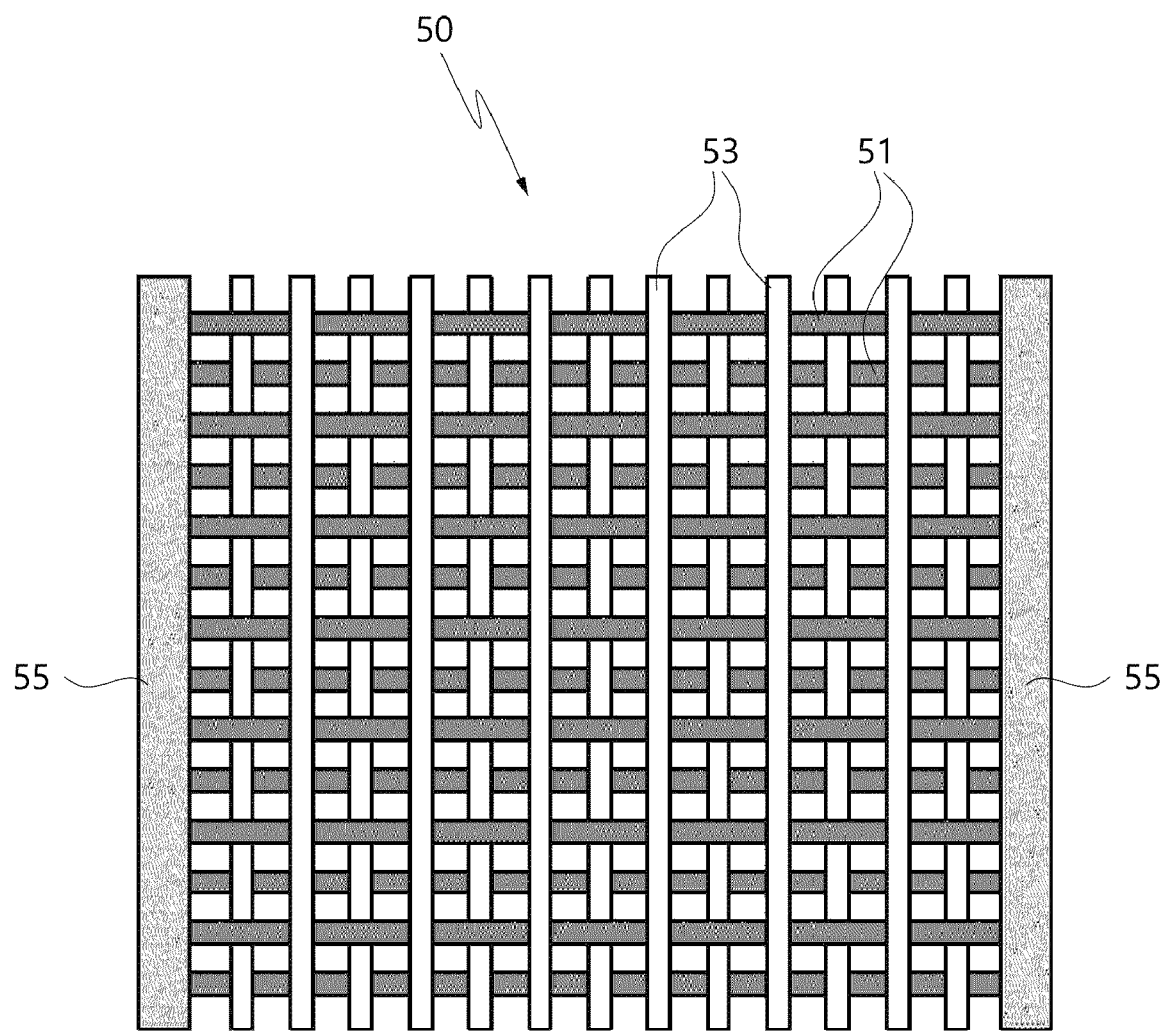

FIG. 7 is a top plan view illustrated by enlarging the configuration of a first electrode layer constituting the filter body of the present disclosure.

Figure 8:
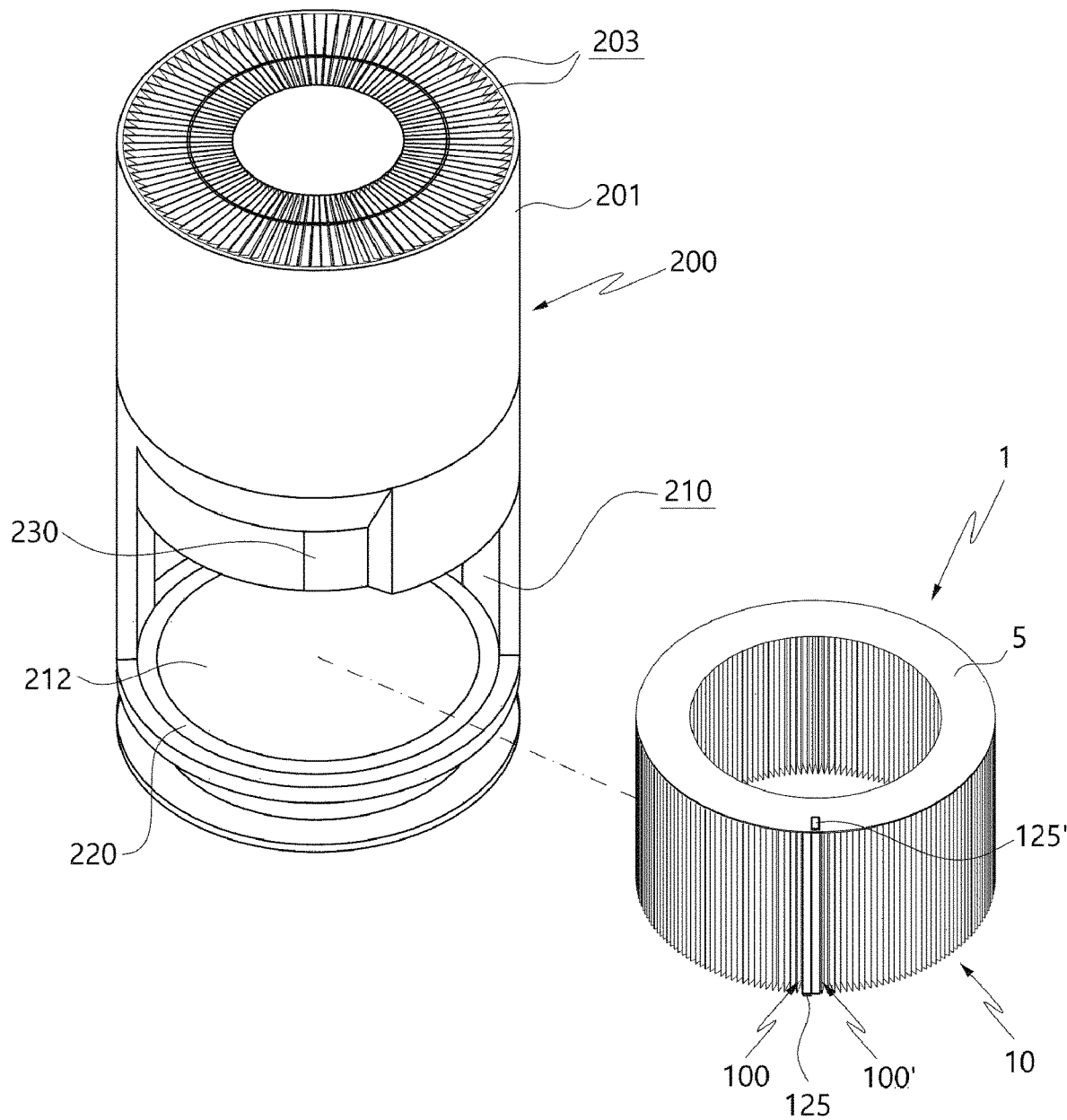

FIG. 8 is a perspective view illustrating a state in which the air purification filter is removed from an air purifier according to the embodiment of the present disclosure.

Figure 9:
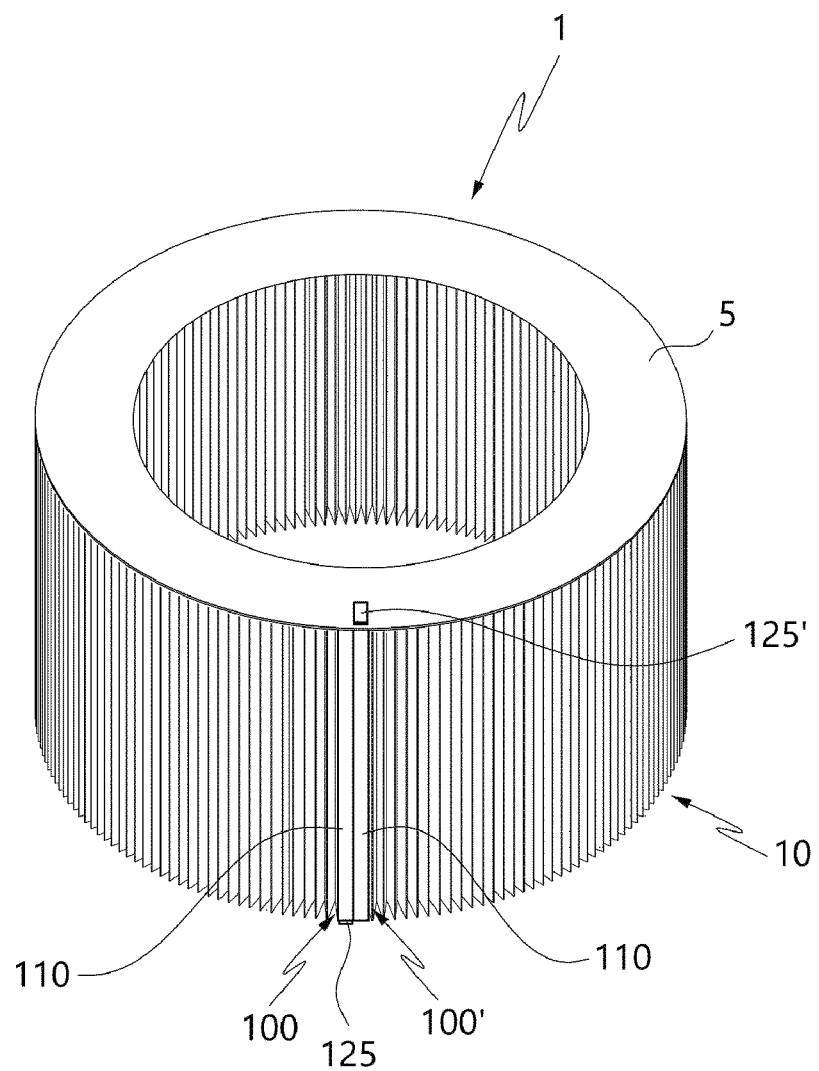

FIG. 9 is a perspective view illustrating a filter having a cylindrical shape formed by coupling the filter body and a connection module to each other constituting the air purification filter of the present disclosure.

Figure 10:
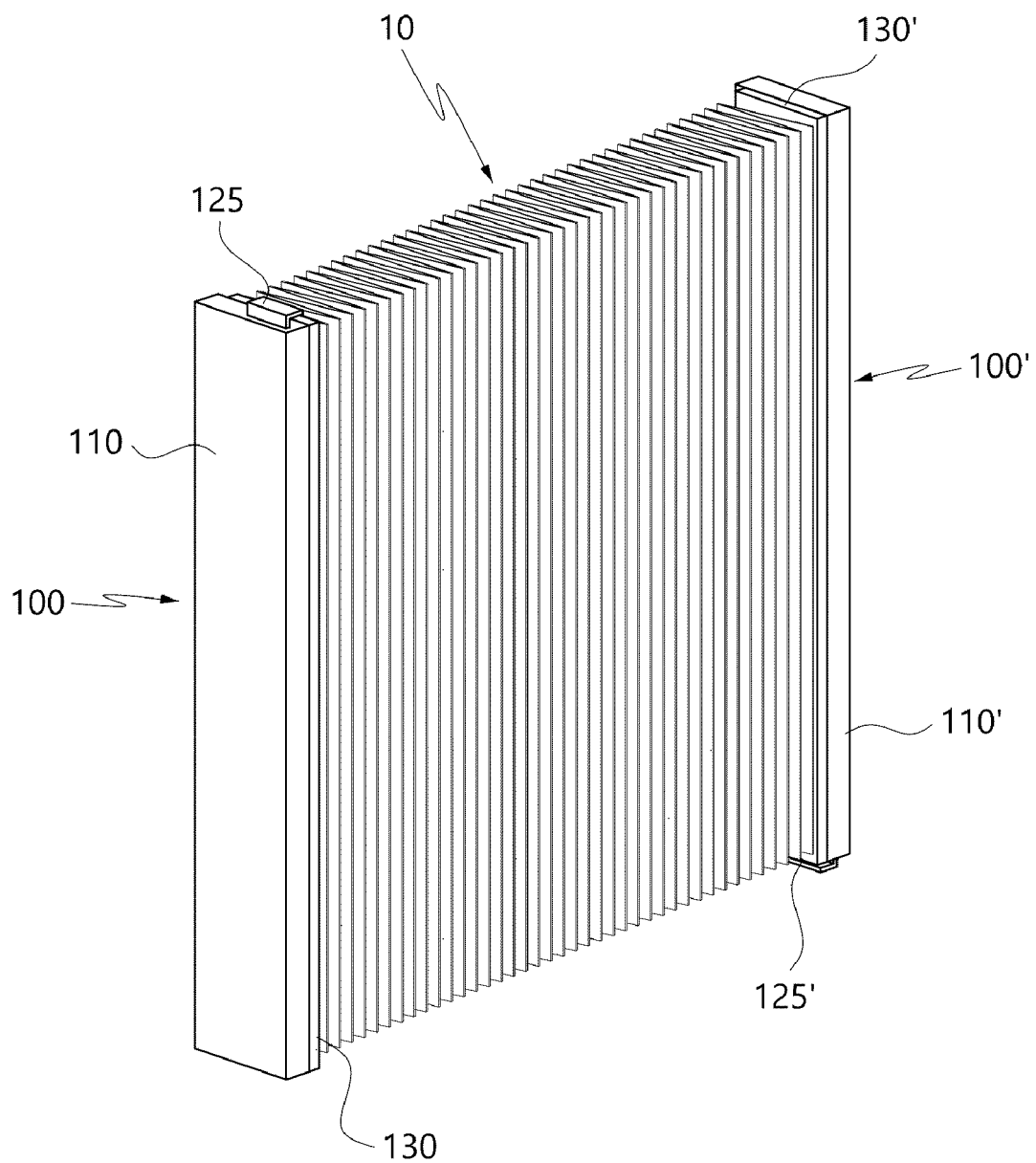

FIG. 10 is a perspective view illustrating a filter having the shape of a flat plate formed by coupling the filter body and the connection module to each other constituting the air purification filter of the present disclosure.

Figure 11:
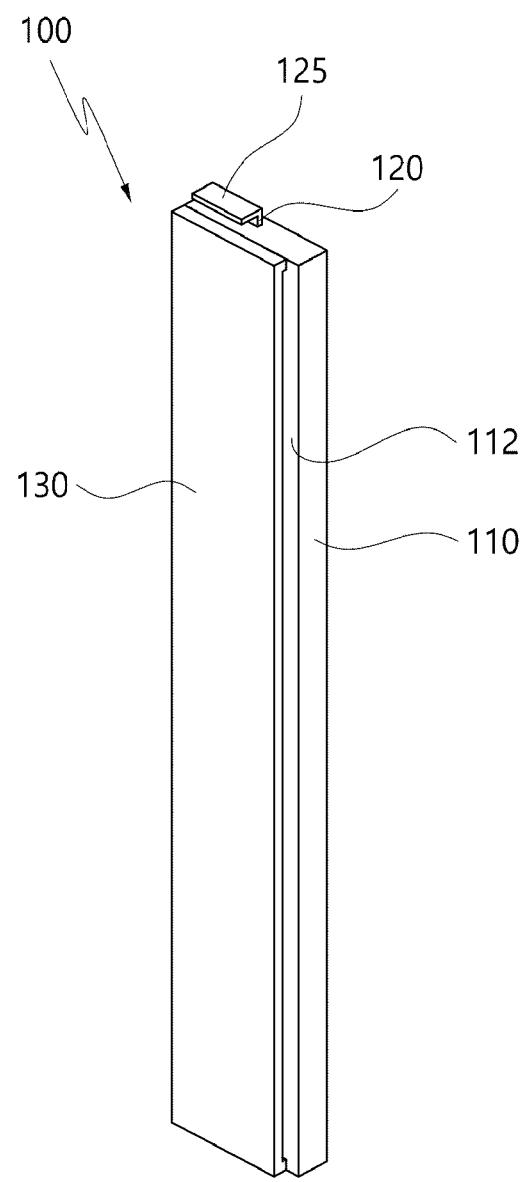

FIG. 11 is a perspective view illustrating the configuration of the connection module constituting the air purification filter of the present disclosure.

Figure 12:
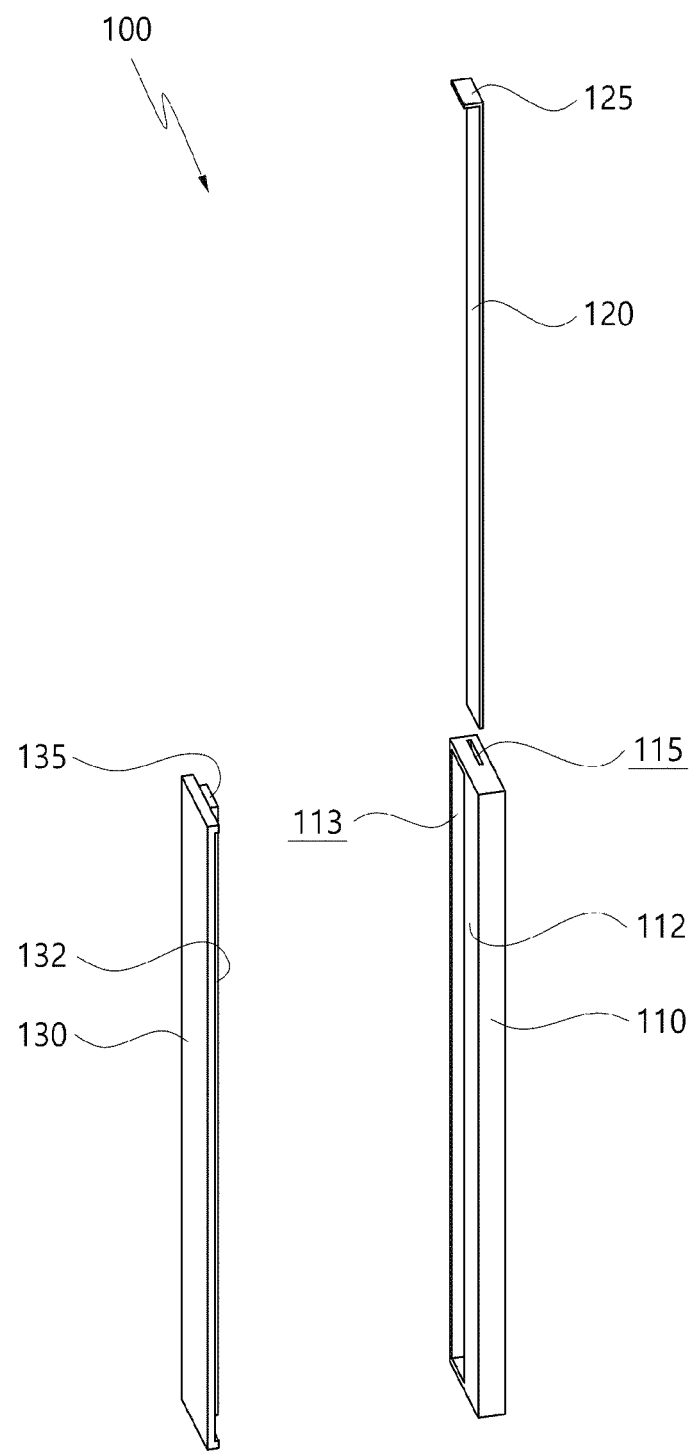

FIG. 12 is an exploded perspective view of components of the connection module illustrated in FIG. 11.

Figure 13:
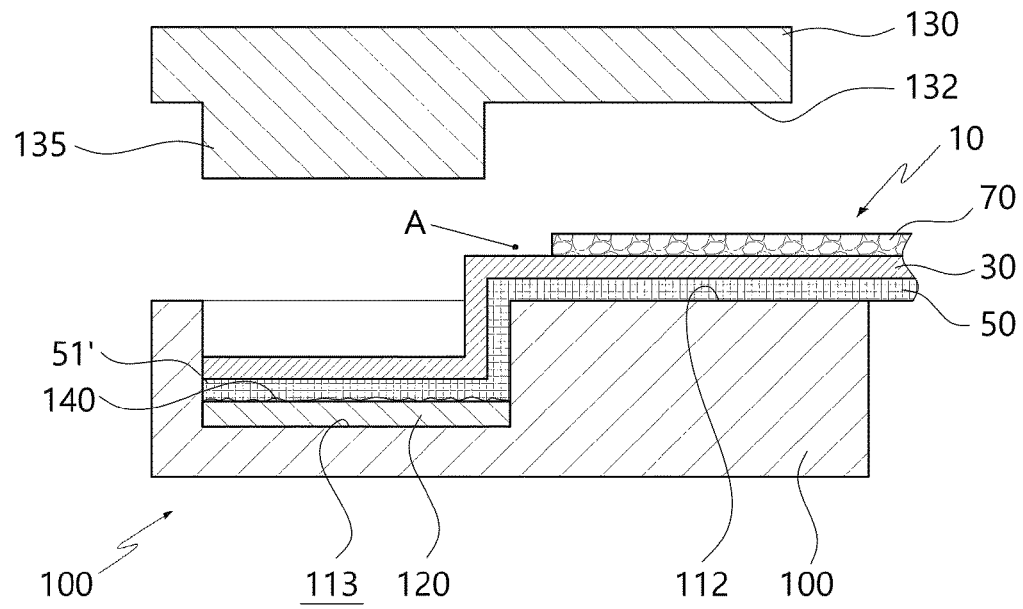

FIG. 13 is a cross-sectional view illustrating the internal structure of a first connection module coupled to any one end of the filter body of the air purification filter of the present disclosure.

Figure 14:
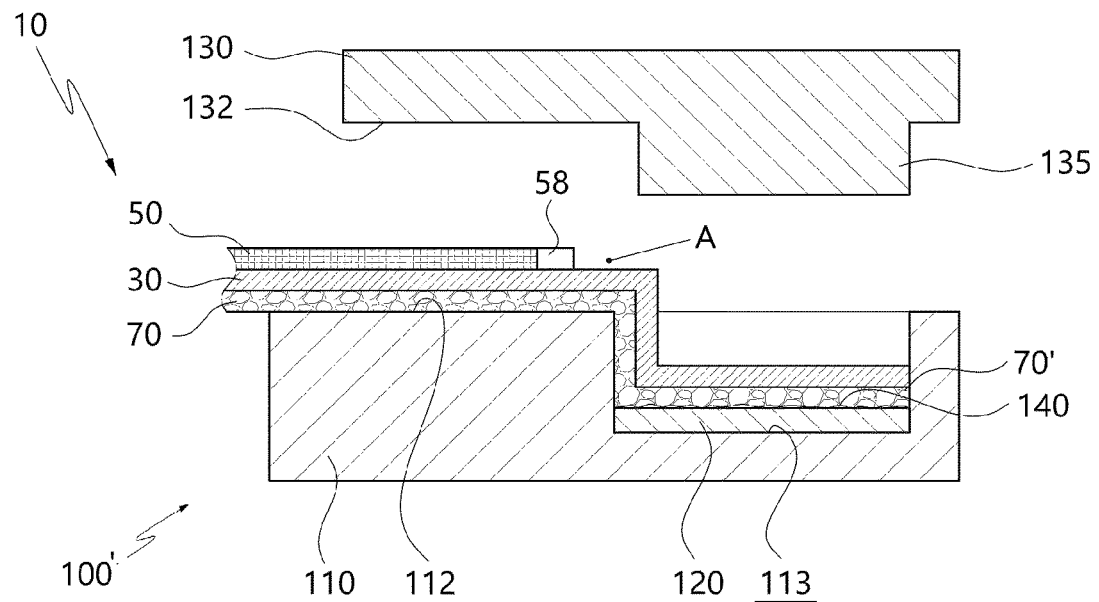

FIG. 14 is a cross-sectional view illustrating the internal structure of a second connection module coupled to an end opposite to the one end of the filter body of the air purification filter of the present disclosure.

MODE FOR INVENTION

Hereinbelow, embodiments of the present disclosure will be described in detail with reference to exemplary drawings. In giving reference numerals to components in each drawing, it should be noted that the same components are given the same reference numerals as much as possible although they are illustrated in different drawings. In addition, in describing the embodiments of the present disclosure, when it is determined that a detailed description of a related known configuration or function interferes with the understanding of the embodiments of the present disclosure, a detailed description thereof will be omitted.

In addition, in describing components according to the embodiments of the present disclosure, terms such as first, second, A, B, (a), and (b) may be used. These terms are only for distinguishing the components from other components, and the nature or order of the components is not limited by the terms. When a component is described as being "connected" or "coupled" to another component, the component may be directly connected to or coupled to the another component, but it should be understood that still another component may be "connected" or "coupled" thereto between each component.

The present disclosure relates to an air purification filter 1 (see FIG. 8), and an air purifier 200 (see FIG. 8) including the same, and more particularly, relates to an air purification filter 1 which can more effectively collect dust by polarizing a portion of the filter by electrostatic induction generated when power is supplied to the filter. That is, the air purification filter of the present disclosure may collect fine dust by using static electricity, and may perform sufficient collection performance while maintaining electrostatic force when power is supplied to the filter. To this end, the air purification filter 1 of the present disclosure may be provided with an electrode layer to which power can be applied.

For reference, a filter body 10 of the present disclosure may be used for various devices such as an air purifier, an air conditioner, and a fan, and the air purifier may be used for various purposes, such as a home air purifier or an automobile air purifier. Hereinafter, a filter used in a general home air purifier 200 will be described as an example.

First, the filter body 10 will be described. Here, the filter body 10 may include a filtering layer 30 to be described below, and a first electrode layer 50 and a second electrode layer 70 laminated respectively on the opposite sides of the filtering layer 30. Here, a connection module 100 or 100' may be assembled with the filter body to be the air purification filter 1.

Figure 1:
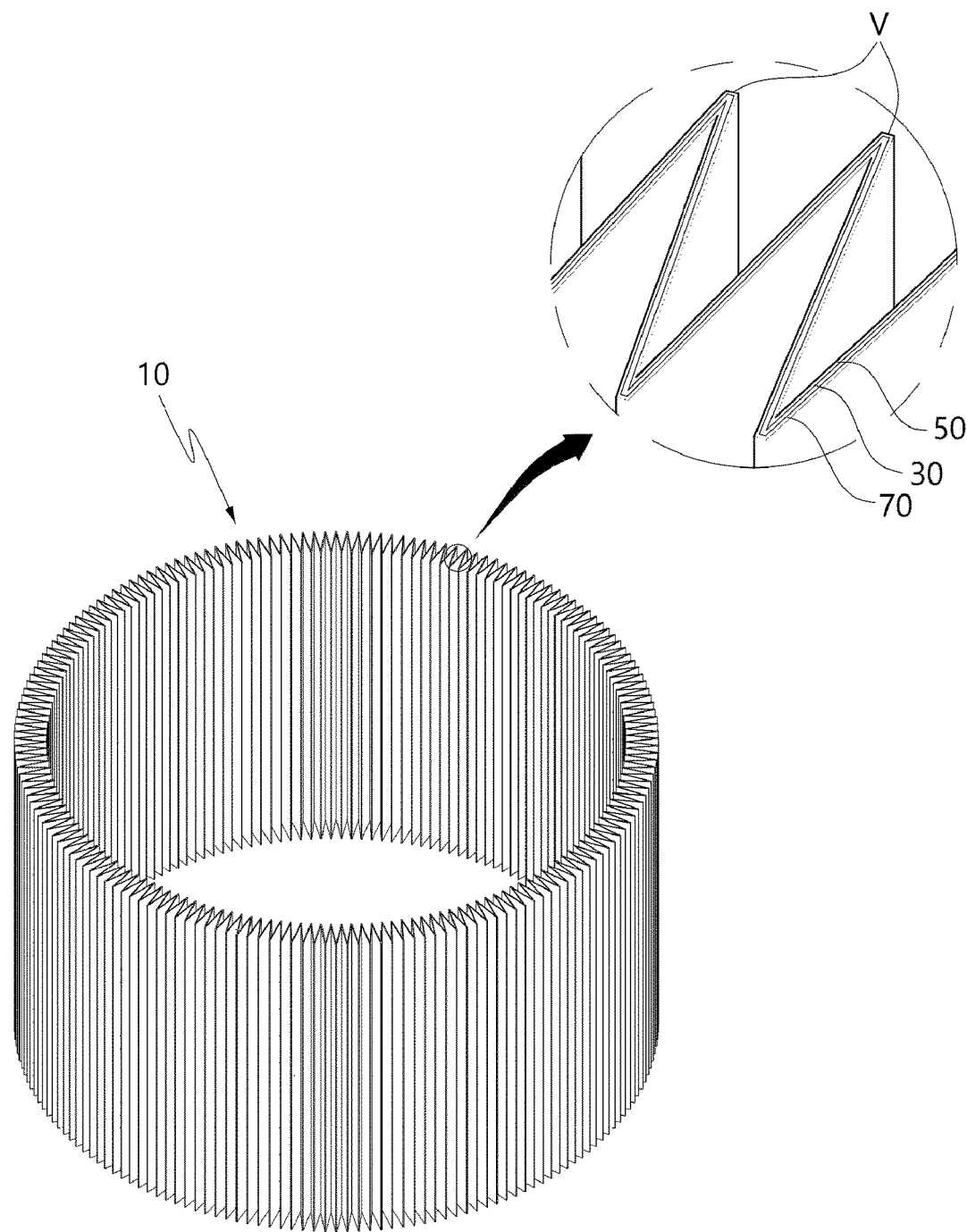
FIG. 1 is a perspective view illustrating a body of an air purification filter of the present disclosure made in a cylindrical shape.

Referring to FIG. 1, a cylindrical filter body 10 is illustrated. The cylindrical filter body 10 may be made by rolling a thin plate-shaped filter base material, and a plate-shaped structure in which the filter body 10 is unfolded can be seen in FIG. 2. Accordingly, the filter body 10 is a thin and flexible material, and thus may be used in various shapes.

Figure 2:
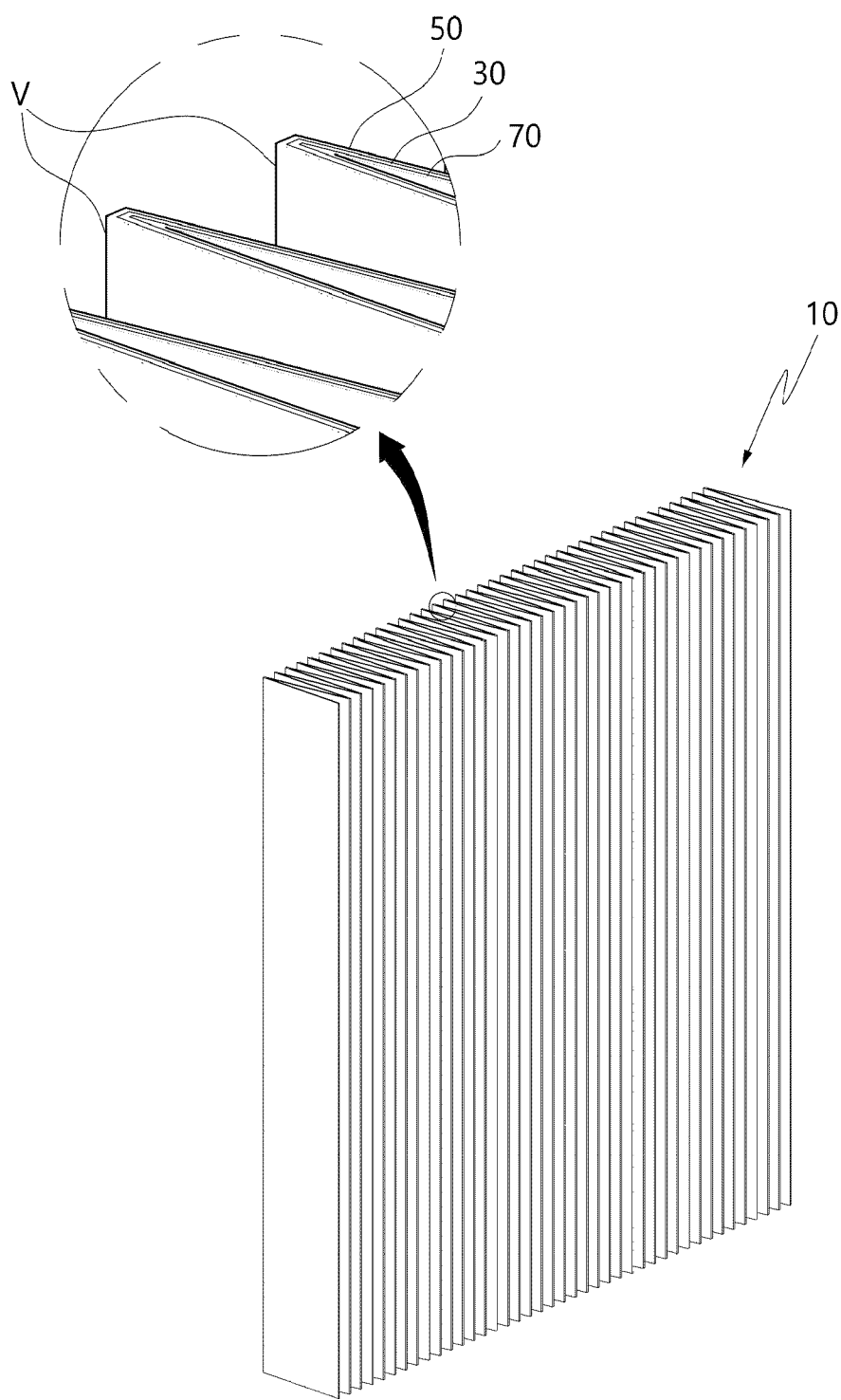
FIG. 2 is a perspective view illustrating the body of the air purification filter of the present disclosure made in a plate shape.

The filter body 10 may have a pleated shape, and such a pleated shape may function to increase the surface area of the filter body 10 so as to increase dust collection efficiency. In FIGS. 1 and 2, the filter body 10 has a pleated shape, and alternatively, the filter body 10 may be made without pleats.

As illustrated in the enlarged views of FIGS. 1 and 2, the filter body 10 of the embodiment may be composed of three layers. Three-layered base materials may be laminated on each other and may be used as one part. Each of these three-layered base materials may be made of a thin material like a kind of fabric, and thus the entire thickness of the three-layered base materials may be thin. Accordingly, the air purification filter may be flexible and may be changed into various shapes as illustrated in FIGS. 1 and 2 and may have even a pleated shape.

Figure 3:
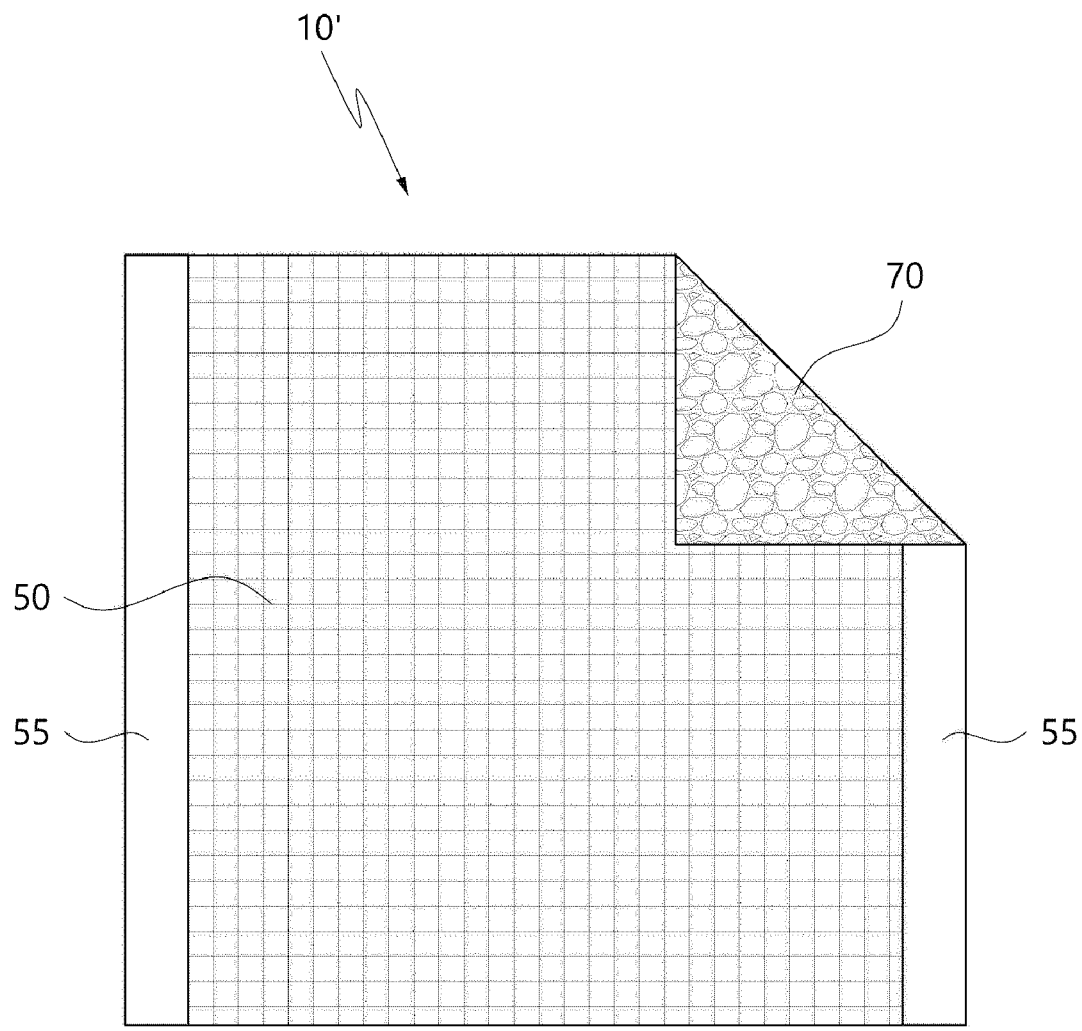
FIG. 3 is a top plan view illustrating an embodiment of the filter body of the present disclosure.

Referring to FIG. 3, the filter body 10 of the present disclosure is illustrated to be unfolded. As illustrated in FIG. 3, in such a filter body 10, pleats may be formed on the filter body 10 having a planar structure, and the filter body 10 may be rolled in a cylindrical shape (an example of FIG. 1) or may be extended long in one direction (an example of FIG. 2) to be used. For reference, in FIG. 3, a portion of the second electrode layer 70 constituting the filter body 10 is illustrated to be folded.

Figure 4:
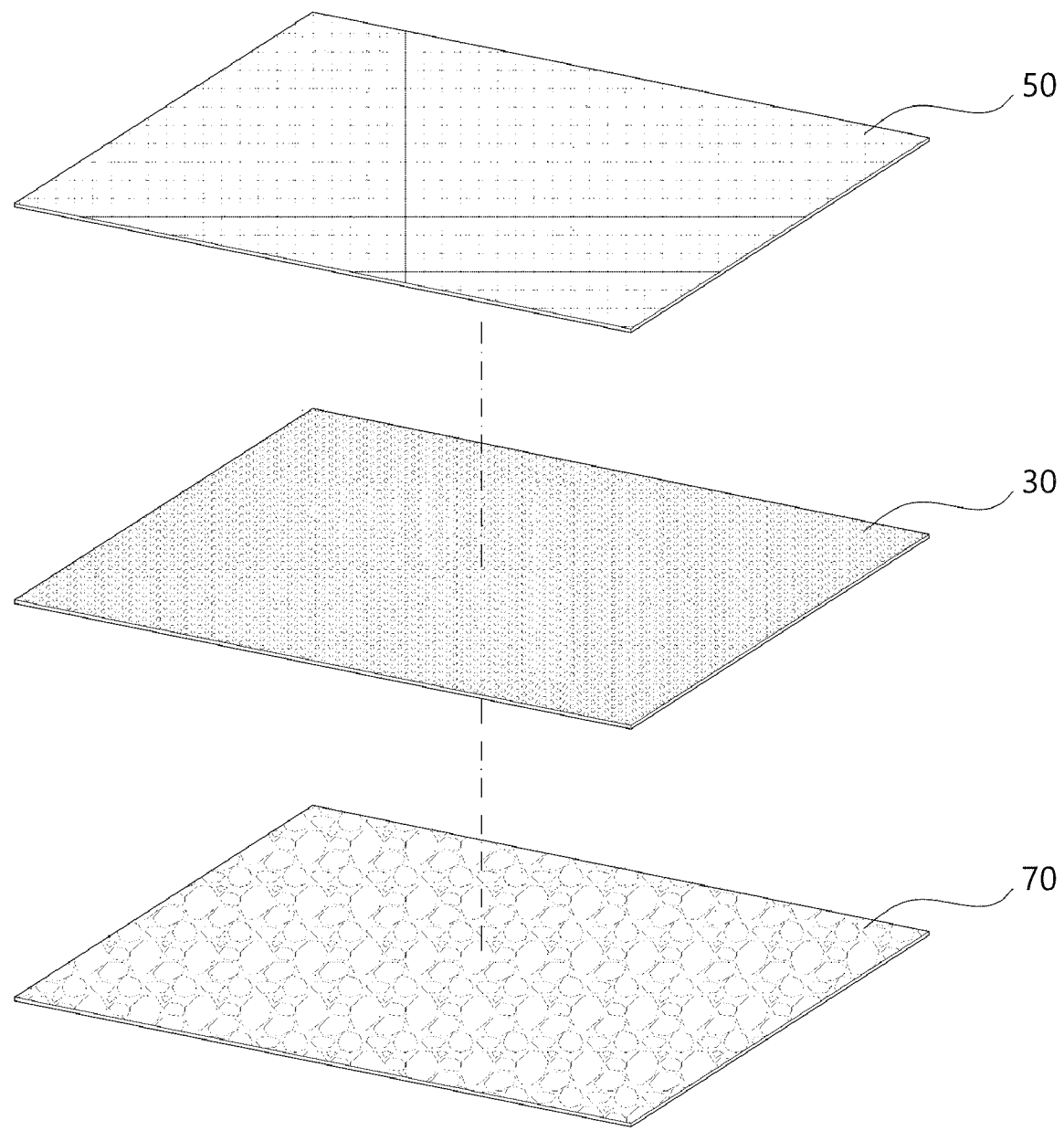
FIG. 4 is a perspective view illustrated by disassembling materials constituting the filter body of the present disclosure according to the embodiment.

As illustrated in FIG. 4, the filter body 10 may be composed of three layers, and a filtering layer 30 which collects and filters minute particles may be located in the center of the three layers, and a pair of electrode layers is superimposed on the opposite sides of the filtering layer 30, respectively. Accordingly, the three base materials may be bonded on each other while being laminated on each other, or may be maintained to be coupled to each other by various methods, such as laser welding, etc.

With the filtering layer 30 placed between the pair of electrode layers, the pair of electrode layers coupled to the opposite sides of the filtering layer 30, respectively, may include the first electrode layer 50 and the second electrode layer 70. Power may be applied to at least any one of the first electrode layer 50 and the second electrode layer 70, and power of opposite polarity may be applied to the remaining one of the first electrode layer 50 and the second electrode layer 70 or the remaining one may be grounded, so polarization may be generated through an electric field in the filtering layer 30 located between the first electrode layer 50 and the second electrode layer 70. To this end, a power supply part 230 of the air purifier 200 (see FIG. 8) may be electrically connected to at least any one of the first electrode layer 50 and the second electrode layer 70.

Here, the power supply part 230 may be provided in the air purifier 200. For example, when the filter body 10 is installed in the air purifier 200, the first electrode layer 50 or the second electrode layer 70 may be naturally connected to the power supply part 230. This will be described again below.

Referring to sections (a) and (b) of FIG. 5, a polarization state before power is applied to the filter body 10 of the present disclosure (FIG. 5_(section a)) and a polarization state after power is applied to the filter body 10 of the present disclosure (FIG. 5 (section_b)) are expressed as conceptual diagrams. As illustrated in the drawing, before power is applied to the filter body 10, more precisely, before the power supply part 230 is connected to the first electrode layer 50 or the second electrode layer 70, the filtering layer 30 which is a dielectric may be maintained to be unpolarized.

However, as illustrated in FIG. 5 (section b), when an anode (+) is applied to the first electrode layer 50 and a cathode (−) is applied to the second electrode layer 70, the filtering layer 30 is dielectrically polarized. Furthermore, dust particles may be dielectrically polarized by an electric field formed in the filtering layer 30 due to the dielectric polarization. That is, electrically charged dust particles may be subjected to Coulombic force. Accordingly, attraction may be generated between the dust particles and the filtering layer 30 separated therefrom, so the dust particles may be adsorbed on the filtering layer 30. Accordingly, the filtering layer 30 may have a higher collection efficiency for all particle diameters than a filter using a mechanical method.

In this case, when looking at the intensity P of polarization, $$P=\varepsilon 0(\varepsilon r-1)E \text{ [C/m2]},$$

$$E=V/d[\text{kV/mm}].$$

ε0 refers to a dielectric constant in vacuum, εr refers to a relative dielectric constant, and E refers to electric field strength. That is, the electric field strength may be proportional to a voltage V applied to the filtering layer 30 and inversely proportional to an electrode gap d.

Referring to EIG. 5, in a state in which the filtering layer 30, which is a dielectric, is located between the first electrode layer 50 and the second electrode layer 70, when a distance between the first electrode layer 50 and the second electrode layer 70 provided on the opposite sides of the filtering layer 30 increases, the electric field strength may decrease, but in the present disclosure, the filtering layer 30 is made of a very thin material, so the electric field strength is greatly affected by the applied voltage V. Accordingly, a filter having a high performance may be embodied by increasing an applied voltage V. Particularly, as described below, when insulation is improved through the connection module 100 or 100', a relatively large voltage may be applied between the first electrode layer 50 and the second electrode layer 70, and the filtering performance of the filtering layer 30 may be improved, and thus even if fine dust particles are continuously attached to and accumulated on the inside of the filter, the activity of electrostatic force of the filter may be constantly maintained.

The filtering layer 30 may have a thin planar structure made of a dielectric material. As a material of the filtering layer 30, a fibrous or particulate dielectric including synthetic organic polymers, natural organic polymers, and inorganic materials may be used. Here, synthetic organic polymers may include polycarbonate, polyester, polyethylene, polyamide, polypropylene, polystyrene, polytetrafluoroethylene, polyvinyl alcohol, and polyvinyl chloride, natural organic polymers may include cellulose, paper (DRY), cotton, and silk, and inorganic materials may include glass, silica, carbon, and alumina. These are only examples, and dielectrics made of various materials may be used as the filtering layer 30.

The first electrode layer 50 laminated on the filtering layer 30 may be configured by interlacing the multiple strands of insulated wires 51 which are laminated on a side of the filtering layer 30 and can receive power. More precisely, the first electrode layer 50 may have a thin planar structure like the filtering layer 30, and may be a kind of fabric material formed by interlacing the multiple strands of insulated wires 51.

Here, the insulated wire 51 may be configured such that a surface thereof is covered and insulated, and an inner core wire thereof is configured as a conductive material. In the embodiment, the insulated wire may be configured as an enameled copper wire. The enameled copper wire refers to a wire insulated in such a manner that insulating enamel is baked and attached on a copper wire to make an insulating film. The insulated wire 51 preferably has a diameter of 0.05 mm to 0.2 mm. This is because the insulated wire 51 has an excessively large resistance when the diameter is less than 0.05 mm, and is thick when the diameter exceeds 0.2 mm, so flexibility of the first electrode layer 50 decreases.

Of course, in addition to an enameled copper wire, various insulated wires may be used as the insulated wires 51. Accordingly, the insulated wires 51 of the embodiment may use ready-made wires that have already been covered and manufactured.

The first electrode layer 50 may be configured (i) by interlacing the multiple strands of insulated wires 51 alone, or (ii) by interlacing the multiple strands of insulated wires 51 and the support lines 53. In the present disclosure, the interlacing means tying multiple materials (the insulated wires 51 or the support lines 53) into multiple strands of materials in lines, arranging the materials side by side, or combining the materials in a way such as weaving, as will be described below.

The support lines 53 may be made of insulating materials, and may be disposed between the insulated wires 51 and may function to maintain the shape of the first electrode layer 50 and reinforce strength thereof. Each of the support lines 53 may have an elongated structure like each of the insulated wires 51, and since the support lines are very thin, the support lines may be interlaced with the insulated wires 51 to make a kind of fabric material.

The support line 53 may be made of a polymer-based material such as polyethylene (PE), polypropylene (PP), and polystyrene (PS), etc., and may be a polyamide material. Of course, the support line 53 may be made of various insulating materials in addition to the materials.

In the embodiment, the first electrode layer 50 may be made to be flexible by interlacing the insulated wires 51 and the support lines 53 such that the insulated wires 51 and the support lines 53 extend in different directions. For example, the first electrode layer 50 may be configured by weaving the insulated wires 51 and the support lines 53. That is, the first electrode layer 50 may be manufactured in a way in which a fabric is made. For example, the first electrode layer 50 may be made by weaving the insulated wires 51 and the support lines 53 such that the insulated wires 51 and the support lines 53 constitute weft and warp yarns, respectively.

Referring to FIG. 7, the first electrode layer 50 is illustrated to be made like one fabric material made by weaving the insulated wires 51 which are weft yarns and the support lines 53 which are warp yarns. Additionally, holes which are empty spaces may be formed between the insulated wires 51 and the support lines 53, and FIG. 7 illustrates a portion of the first electrode layer 50 by enlarging the first electrode layer 50, and these holes may be very small and may be difficult to be seen with the naked eye.

Accordingly, the first electrode layer 50 of the present disclosure may be made by weaving the insulated wires 51 and the support lines 53, and may be rapidly manufactured by using a weaving device, and even a first electrode layer 50 having a large area may be manufactured. As described above, the support lines 53 may be added to the first electrode layer 50, but the first electrode layer 50 may be made by weaving the insulated wires 51 alone.

The first electrode layer 50 may be made like a kind of fabric material when the insulated wires 51 and the support lines 53 are woven together, so as illustrated in FIG. 7, through the regular arrangement of fabrics, the entirety of the electrode layer may be maintained to have a predetermined thickness and be insulated. Furthermore, since the first electrode layer is made by weaving, the first electrode layer 50 may have a very low air pressure differential depending on a location thereof, and may maintain a shape thereof.

Meanwhile, as illustrated in FIG. 7, in the first electrode layer 50, the insulated wires 51 and the support lines 53 may not have similar proportions, but the support lines 53 may constitute weft and warp yarns, and the insulated wires 51 may constitute only a portion of the weft or warp yarns, together with the support lines 53. That is, the insulated wires 51 constitute some of the weft yarns, but the support lines 53 constitute most of the weft and warp yarns. In this case, compared to the embodiment of FIG. 7, although an electric field strength generated when power is applied is small, manufacturing costs may be reduced and the strength of the first electrode layer 50 may be increased according to the type of the support lines 53.

In FIG. 7, the entire area of the first electrode layer 50 is woven, but alternatively, only a portion of the first electrode layer 50 may be woven, and a remaining part thereof may not be woven or may be finished by bonding or taping.

The first electrode layer 50 woven in this manner may be flexible like a kind of fabric material and each of thin flexible insulated wires 51 may be pre-insulated, so even if the first electrode layer is crumpled, the risk of insulation breakdown thereof may be very low. Accordingly, the filter body 10 including the first electrode layer 50 may be used by being folded into various shapes. For example, as illustrated in FIGS. 1 and 2, the filter body 10 has a folded part V due to pleats, but the filtering layer 30, the first electrode layer 50, and the second electrode layer 70 may be all made of flexible materials, so the filter body 10 may be made in various shapes without the risk of insulation breakdown.

In this case, the first electrode layer 50 may be made in various ways other than weaving. For example, the first electrode layer 50 may be made as a knitted fabric by knitting. Additionally, the first electrode layer 50 may be made by using various processing methods such as a twill weave, a satin weave, a double weave, a doup weave, and a fancy weave. Furthermore, the first electrode layer 50 having a planar structure may be made in such a manner that the multiple strands of insulated wires 51 and the support lines 53 are mixed with each other such that the multiple strands of insulated wires 51 and the support lines 53 extend in parallel to each other, and opposite edges thereof or four corners thereof are fixed.

Meanwhile, as illustrated in FIG. 3, a conductive member 55 may be connected to the first electrode layer 50. The conductive member 55 may be considered as a kind of terminal for applying external power to the first electrode layer 50, and may be connected to each of the opposite end parts of the first electrode layer 50, or only to any one end part thereof as illustrated in FIG. 3.

The conductive member 55 may be made of a thin plate-shaped conductive material, and may be connected to the edge of the first electrode layer 50. Accordingly, the conductive member 55 may be connected to an end of each of multiple insulated wires 51 constituting the first electrode layer 50 in a direction crossing the end so as to allow current to flow to the multiple insulated wires 51. Accordingly, when power of the power supply part 230 is applied to the conductive member 55, the conductive member 55 may transmit power simultaneously to the multiple strands of insulated wires 51.

The conductive member 55 may be made of a conductive material, and for example, may be made of thin sheets of stainless steel, aluminum, and copper, etc., or may be configured as a conductive tape. Furthermore, the conductive member 55 may be coupled to the insulated wires 51 by welding or conductive paste 140. Additionally, the conductive member 55 may be insulated except for parts connected to the power supply part 230 and the insulated wires 51.

The conductive member 55 may include a pair of the conductive members and may be connected to the first electrode layer 50 and to the second electrode layer 70. Meanwhile, the conductive member 55 may be a part of the connection module 100 or 100'. For example, a module terminal 120 of the connection module 100 or 100' to be described below may be coupled to the conductive member 55, or the conductive member 55 may be a part of the module terminal 120. Additionally, the module terminal 120 may take the place of the conductive member 55, and the conductive member 55 may be omitted. The connection module 100 or 100' will be described again below.

As illustrated in FIGS. 3 and 4, the second electrode layer 70 may be laminated on a side of the filtering layer 30 opposite to the side of the first electrode layer, and, together with the first electrode layer 50, may create electrostatic induction in the filtering layer 30. The second electrode layer 70, like the first electrode layer 50, may be made of a thin flexible material like a fabric material, and may include a conductive material to form an electric field.

A polarity opposite to the polarity of the first electrode layer 50 may be applied to the second electrode layer 70 from the power supply part 230, or the second electrode layer 70 may be grounded without being connected to the power supply part 230. For example, an anode (+) may be applied to the first electrode layer 50, and a cathode (−) may be applied to the second electrode layer 70, or the second electrode layer 70 may be grounded.

The surface of the second electrode layer 70 may be insulated like the first electrode layer 50, and a core wire thereof may be made to be flexible in such a manner that an insulated wire 51 which is electrically conductive and a support line 53 which is an insulator are interlaced together in different directions from each other. As described above, the second electrode layer 70 may be manufactured by weaving.

Alternatively, in the embodiment, the second electrode layer 70 is made of a fabric material containing a conductive material. For example, the second electrode layer 70 may be a fabric material whose surface is coated with carbon. As illustrated in FIGS. 3 and 4, in the embodiment, carbon coating may be performed on the surface of the second electrode layer 70, so the second electrode layer 70 may be conductive. Of course, although the second electrode layer is not as conductive as the first electrode layer 50 composed of the insulated wires 51, the second electrode layer may have conductivity sufficient to polarize the filtering layer 30 located between the first electrode layer 50 and the second electrode layer. The second electrode layer 70 may be coated with metal instead of carbon. In the embodiment, the second electrode layer 70 is made by coating the surface of a non-woven base material with carbon.

Referring to FIG. 6, an insulated section 73 in which a conductive material is omitted may be formed on the edge of the second electrode layer 70. Such an insulated section 73, which is a section having no conductive material, may be considered, for example, as a part of the second electrode layer 70 in which carbon coating is omitted. Such an insulated section 73 may be an insulation distance between the pair of electrode layers. Accordingly, the air purification filter of the present disclosure may have the insulated section 73 without a need for an additional insulation work, so insulation may be securely realized between the pair of electrode layers.

The end part of each of the insulated wires 51 constituting the first electrode layer 50 may be exposed to the outside without being coated, and may be in contact with the second electrode layer 70, and thus current may flow therebetween. When the current flows therebetween, insulation breakdown may occur between the first electrode layer 50 and the second electrode layer 70, and thus there is a possibility that the filtering layer 30 is no longer polarized. Accordingly, this possibility may be reduced by such an insulated section 73. The insulated section 73 may extend along the edge of each of the upper and lower surfaces of the second electrode layer 70 adjacent to the first electrode layer 50. Of course, the insulated section 73 may be formed even on the first electrode layer 50 or may be formed only on the first electrode layer 50. Such an insulation section 73 may function to insulate the filter 1 together with the connection module 100 or 100' to be described later.

Accordingly, in the above embodiment, the first electrode layer 50 may be configured by interlacing the insulated wire 51 and the support line 53, and the second electrode layer 70 may be made of a fabric material containing a conductive material. Alternatively, both the first electrode layer 50 and the second electrode layer 70 may be made of fabric materials containing conductive materials, that is, of fabric materials which are coated with carbon.

Referring to FIG. 13, the first electrode layer 50 and the second electrode layer 70 may have lengths different from each other, with the filtering layer 30 placed therebetween, so an insulation step part A may be made between the first electrode layer 50 and the second electrode layer 70. Such an insulation step part A may function to increase the insulation performance of the filter by spacing neighboring end parts of the first electrode layer 50 and the second electrode layer 70 apart from each other. This will be described again below.

Next, the air purifier 200 of the present disclosure will be described with reference to FIG. 8. In FIG. 8, the air purifier 200 and the filter 1 are illustrated to be separated from each other. The filter 1 may be configured by coupling the connection module 100 or 100' to the filter body 10 described above. For convenience of explanation, before the explanation of the connection module 100 or 100', the air purifier 200 will be first explained. For reference, a reference numeral 5 refers to a guide plate maintaining the shape of the filter 1.

As illustrated in FIG. 8, the frame of the air purifier 200 is constituted by a purifier housing 201, and in this embodiment, the purifier housing 201 has a cylindrical shape. Air discharge holes 203 are formed in the upper end of the purifier housing 201 so as to discharge air filtered through the filter 1 after being introduced into the air purifier.

A filter installation space 210 may be defined inside the purifier housing 201. The filter installation space 210 may a kind of empty space and may have a cylindrical shape. Accordingly, this embodiment, as illustrated in FIGS. 8 and 9, the filter 1 having a cylindrical shape may be mounted in the filter installation space 210. The filter 1 may be inserted into and mounted to the filter installation space 210, and a structure and a cover for fixing or separating the filter 1 are omitted.

Alternatively, the purifier housing 201 and the filter installation space 210 may not have cylindrical shapes but hexahedral shapes. In this case, as illustrated in FIG. 10, the filter 1 having the structure of a flat plate may be installed in the air purifier 200.

Referring back to FIG. 8, a mounting surface 212 may be provided on the bottom surface of the filter installation space 210 of the purifier housing 201. The mounting surface 212 may constitute a bottom surface on which the filter 1 is seated, and in the embodiment, may have a disk structure corresponding to the shape of the purifier housing 201. A mounting surface having a shape corresponding to the shape of the mounting surface 212 may be provided even on a ceiling of the filter installation space 210 which is a side opposite to the mounting surface 212, and is not visible because of the angle of the air purifier illustrated in FIG. 8.

The connection terminal may be provided in the filter installation space 210. The connection terminal may be in contact with and electrically connected to the terminal head 125 or 125' of the connection module 100 or 100' of the filter to be described below, and may be mounted in the filter installation space 210. The connection terminal may be connected to the power supply part 230 installed on the purifier housing 201 or may be grounded. The connection terminal may include a pair of connection terminals, and a first connection terminal of the connection terminals may be connected to the power supply part 230, and a second connection terminal 220 may be connected to the power supply part 230 by having a polarity opposite to the polarity of the first connection terminal or may be grounded. In FIG. 8, only the second connection terminal 220 is visible, and the first connection terminal located on the ceiling of the filter installation space 210 is not visible.

More specifically, the first connection terminal which is connected to the power supply part 230, and the second connection terminal 220 which is connected to the power supply part 230 by having a polarity opposite to the polarity of the first connection terminal or is grounded may be installed in the filter installation space 210. Furthermore, when the filter 1 is installed in the filter installation space 210, a first connection module 100 and a second connection module 100' to be described below may be electrically connected to the second connection terminal 220 and the first connection terminal, respectively.

The first connection terminal and the second connection terminal 220 may be located at different heights from each other. The second connection terminal 220 is installed on the mounting surface 212, and the first connection terminal is installed on the ceiling of the filter installation space 210, and is not shown in the drawing. The first connection terminal and the second connection terminal 220 may be respectively connected to a second module terminal 120 of the second connection module 100' and a first module terminal 120 of the first connection module 100 which will be described below, and the first module terminal 120 and the second module terminal 120 may protrude in directions opposite to each other and may be in contact with the first connection terminal and the second connection terminal 220. To this end, the first connection terminal and the second connection terminal 220 may be respectively installed on different positions by having different heights to match the heights of the first module terminal 120 and the second module terminal 120.

As illustrated in FIGS. 8 and 9, when the filter body 10 of the filter is rolled and has a cylindrical shape, any one of the first connection terminal and the second connection terminal 220 may also be configured to have a circular shape. That is, the first connection terminal or the second connection terminal 220 may be made in a circular shape corresponding to the filter body 10, and in this embodiment, both the first connection terminal and the second connection terminal 220 have circular shapes.

In this case, referring to the second connection terminal 220 illustrated in FIG. 8, the second connection terminal 220 may be made along a virtual circular extension line drawn by a second terminal head 125' protruding from the second connection module 100' to be described below while the second terminal head rotates relative to the center of the filter body 10 having a circular shape. Accordingly, even when the filter 1 is inserted in any direction, the filter 1 may be in contact with and electrically connected to the circular second connection terminal 220.

In this embodiment, as illustrated in FIGS. 8 to 10, in the filter, a first terminal head 125 of the first connection module 100 and the second terminal head 125' of the second connection module 100' may protrude in directions opposite to each other, and the first connection terminal and the second connection terminal 220 may respectively extend to have circular shapes to be spaced apart from each other by corresponding to the heights of the first connection module 100 and the second connection module 100'. In addition, the first connection terminal may also be made along a virtual circular extension line drawn by the first terminal head 125 protruding from the first connection module 100 while the first terminal head 125 rotates relative to the center of the filter body 10 having a circular shape.

Meanwhile, the first connection terminal and the second connection terminal 220 may be respectively provided along straight paths. When the filter 1 has the structure of a flat plate as illustrated in FIG. 10, the filter 1 may be inserted into the filter installation space 210 along the straight path, and thus the first connection terminal and the second connection terminal 220 may extend to be long along the straight paths according to the insertion paths of the filter. In this case, each of the first connection terminal and the second connection terminal 220 may have a busbar structure extending in one direction.

Unlike this, the first connection terminal and the second connection terminal 220 may not extend to be long in one direction, but may respectively be short terminal structures located at positions corresponding to the second terminal head 125' of the second connection module 100' and the first terminal head 125 of the first connection module 100, respectively. When the filter 1 is completely inserted into the filter installation space 210, the first terminal head 125 and the second terminal head 125' may be in contact with the second connection terminal 220 and the first connection terminal, respectively.

In this case, as illustrated in FIG. 10, even when the filter 1 has the structure of a flat plate, the first connection terminal and the second connection terminal 220 may be configured such that the insertion direction of the filter is not specified. Although not shown, for example, the first connection terminal may include a pair of first connection terminals which has different heights from each other or has different positions in left and right directions, and the second connection terminal 220 may also include a pair of second connection terminals which has different heights from each other or has different positions in left and right directions, respectively. In this case, even when the filter 1 is inserted into the filter installation space 210 in a state of being turned in a left-to-right direction or in a vertical direction, the filter may be in contact with the first connection terminal and the second connection terminal 220.

Next, the filter will be described. The filter may include the filter body 10 and the connection module 100 or 100', and since the filter body 10 has been described above, the connection module 100 or 100' will be described. The connection module 100 or 100' may be coupled to at least any one of the opposite ends of the filter body 10 so as to insulate an end of the filter body 10 from the outside and at the same time, may be electrically connected to the power supply part 230.

That, the connection module 100 or 100' may electrically connect any one of the first electrode layer 50 and the second electrode layer 70 to the power supply part 230, and may allow a peripheral part of the electrode layer except for a part thereof for the electrical connection to be insulated from the outside. Accordingly, the connection module 100 or 100' may completely cover and insulate an end part of the insulator of the electrode layer exposed to the outside, and thus may securely insulate the electrode part of the filter. Particularly, even if two electrodes are close to each other due to the thin thickness of the filter, the connection module 100 or 100' may realize complete insulation between the two electrodes. Accordingly, the connection module 100 or 100' may be considered as a kind of connector.

The connection module 100 or 100' may be coupled to the filter body 10 and may, together with the filter body, constitute the filter. As described below, the connection module may be coupled to each of the opposite sides of the filter body 10, or only to any one side thereof. The connection module 100 or 100' may insulate the end part of the filter body 10 from the outside. As illustrated in FIGS. 8 and 9, in the case in which the filter 1 has a cylindrical shape, the connection module 100 or 100' may allow the opposite ends of the filter body 10 to be insulated from each other. In this case, even if the connection module 100 or 100' is provided on any one end of the filter body 10, the any one end thereof may be insulated from a remaining end thereof.

Here, the end part of the filter body refers to a part of a conductor, which is exposed to the outside, on an end of each of the first electrode layer 50 and the second electrode layer 70 constituting the filter body 10. For example, in a cut end part of the insulated wire 51 constituting the first electrode layer 50, a core wire thereof which is a conductor may be exposed to the outside, and an end part of a carbon coated part constituting the second electrode layer 70 may also be exposed to the outside. Of course, the entirety of the carbon coated part of the second electrode layer 70 including the end part thereof may be exposed to the outside. Furthermore, a conductor is made of a conductive material, and in the first electrode layer 50, the core wire of the insulated wire 51 may be a conductor, and in the second electrode layer 70, the entirety of the carbon coated part thereof may be a conductor.

In the embodiment, the connection module 100 or 100' may include the first connection module 100 and the second connection module 100' which have the same structures. Accordingly, the parts having the same structures are given the same reference numerals in the drawings, and the first connection module 100 will be described hereinbelow. Referring to FIG. 11, the frame of the first connection module 100 may be constituted by module housings 110 and 130. Each of the module housings 110 and 130 may be made of an insulating material, and may insulate an end part of the filter body 10 connected to the first connection module 100. The module housing 110 or 130 may have a hexahedral shape extending long in one direction, wherein the length of the module housing 110 or 130 may be greater than or equal to the length of the filter body 10. Here, the length of the module housing 110 or 130 is a vertical length relative to FIG. 11.

In the embodiment, the module housing 110 or 130 may include two bodies, and a connection space 113 may be defined between the two bodies. Referring to FIG. 12, the module housing 110 or 130 may include a first housing 110 and a second housing 130. The first housing 110 and the second housing 130 may be assembled with each other to constitute one body, and the second housing 130 may be considered as a kind of cover. The end part of the filter body 10 may be inserted between the first housing 110 and the second housing 130.

The connection space 113 may be defined inside the first housing 110. The connection space 113 may extend in the longitudinal direction of the first housing 110, and may have a shape recessed toward the inside of the first housing 110. The connection end part 51' of the first electrode layer 50 or the connection end part 70' of the second electrode layer 70 which is the exposed end part of the conductor of the first electrode layer 50 or the second electrode layer 70 may be inserted into the connection space 113. In the embodiment, the module terminal 120 may be installed in the connection space 113, and thus the connection end part may be electrically connected to the module terminal 120 by being laminated thereon. Here, the connection end part 51' or 70 indicates a part of the conductor exposed to the outside.

A first insulation surface 112 may be provided on a surface of the first housing 110 facing the second housing 130. The first insulation surface 112 may be adjacent to the connection space 113 and may have the height of a bottom surface different from the height of the bottom surface of the connection space 113. When the first housing 110 and the second housing 130 are assembled with each other, the first insulation surface 112 may be in close contact with a second insulation surface 132 of the second housing 130. As illustrated in FIG. 13, when the connection end part 51' of the first electrode layer 50 is inserted into the connection space 113, the connection end part 70' of the second electrode layer 70 may be inserted between the first insulation surface 112 and the second insulation surface 132 so as to be covered therewith.

Of course, contrarily, as illustrated in FIG. 14, when the connection end part 70' of the second electrode layer 70 is inserted into the connection space 113, the connection end part 51' of the first electrode layer 50 may be inserted between the first insulation surface 112 and the second insulation surface 132 so as to be covered therewith. Accordingly, the first connection module 100 may be coupled to an end part of the electrode layer so as to insulate the electrode layer. An insulating material may be applied to the electrode layer for insulation, or an end part thereof to which current easily flows is not required to be insulated.

The first housing 110 may have a terminal hole 115. The terminal hole 115 may be a part formed through a portion of the first housing 110 in the longitudinal direction of the connection space 113. In the embodiment, the terminal hole 115 may be located on the upper surface of the first housing 110. The first terminal head 125 connected to the module terminal 120 may protrude through the terminal hole 115 to the outside. More precisely, the module terminal 120 may be inserted through the terminal hole 115 into the connection space 113. Alternatively, the terminal hole 115 may not be formed through the first housing 110, but may be space open upward by further extending the connection space 113 of the first housing 110 upward.

The module terminal 120 may be mounted to the first housing 110. The module terminal 120, which is a conductor, may be electrically connected to the connection end part 51' or 70' of the first electrode layer 50 or the second electrode layer 70 of the filter body 10 in the connection space 113 of the first housing 110. When the first housing 110 and the second housing 130 are assembled with each other, the remaining portion of the module terminal 120 except for the terminal head 125 protruding through the terminal hole 115 may be covered and insulated. That is, the module terminal 120 may be seated on the bottom of the connection space 113 defined in the module housing 110 or 130 of the first connection module 100, and the connection end part 51' or 70' of the conductor of any one of the first electrode layer 50 and the second electrode layer 70 may be laminated on the surface of the module terminal 120.

The module terminal 120 may extend long in the longitudinal direction of the connection space 113. In the embodiment, the module terminal 120, which has the structure of a metal flat plate, may have the shape of a kind of busbar. The module terminal 120 may be connected to the connection end part 51' of the first electrode layer 50 or the connection end part 70' of the second electrode layer 70. The module terminal 120 may be coupled transversely to the connection end part 51' of the conductor, whose conductive material is exposed to the outside, of the first electrode layer 50 or the second electrode layer 70 which receives power from the power supply part 230 so as to polarize the filtering layer 30. For example, in the case of the first electrode layer 50 having insulated wires 51, when an end part of the first electrode layer 50 is seated in the connection space 113, the end parts 51' of the multiple strands of insulated wires 51 may be simultaneously connected to the module terminal 120.

The first connection module 100 may have the second housing 130. The second housing 130 may be assembled with the first housing 110, and when the second housing 130 is assembled with the first housing 110, the connection space 113 may be covered. The second housing 130 may be made of an insulated material like the first housing 110. In the embodiment, the second housing 130 may be press-fitted into the first housing 110, and alternatively, may have a separate coupling protrusion so as to be coupled to the first housing. Alternatively, the first housing 110 and the second housing 130 may be assembled with each other by sliding or by separate fasteners.

The second housing 130 may have the second insulation surface 132. When the first housing 110 and the second housing 130 are assembled with each other, the second insulation surface 132 may be a part in close contact with the first insulation surface 112 of the first housing 110. As illustrated in FIG. 13, when the connection end part 51' of the first electrode layer 50 is inserted into the connection space 113, the connection end part 70' of the second electrode layer 70 may be inserted between the first insulation surface 112 and the second insulation surface 132 so as to be covered.

A press block 135 may protrude on the second housing 130. The press block 135 may protrude from the second housing 130 toward the connection space 113. The press block 135 may advance into the connection space 113. When the first housing 110 and the second housing 130 are assembled with each other, the module terminal 120 and the connection end part 51' or 70' of a conductor of any one of the first electrode layer 50 or the second electrode layer 70, which are laminated in the connection space 113, may be pressed by the press block 135. Accordingly, the press block 135 may allow electrical connection between the module terminal 120 and the filter body 10 to be stably performed.

In the embodiment, the connection module 100 or 100' may include the first connection module 100 and the second connection module 100' coupled to the opposite sides of the filter body 10, respectively. Furthermore, the first connection module 100 and the second connection module 100' may be electrically connected to the first electrode layer 50 and the second electrode layer 70, respectively. When the filter 1 is rolled into a cylindrical shape (see FIGS. 8 and 9), the first connection module 100 and the second connection module 100' may be in close contact with each other. Accordingly, the first connection module 100 and the second connection module 100' may have a structure for assembly thereof with each other, and although not shown, may have assembly structures such as press-fit protrusions, hooks or magnets. In this case, the filter body 10 may not be required to have a separate structure so as to maintain a rolled cylindrical shape thereof.

In FIGS. 13 and 14, respectively, states in which the filter body 10 and the first connection module 100 are assembled with each other and the filter body 10 and the second connection module 100' are assembled with each other are illustrated as cross-sectional views. For reference, FIG. 13 illustrates a state in which the connection end part 51' of the first electrode layer 50 in the filter body 10 is laminated on the module terminal 120 of the first connection module 100, and FIG. 14 illustrates a state in which the connection end part 70' of the second electrode layer 70 in the filter body 10 is laminated on the module terminal 120 of the second connection module 100'.

Referring to FIG. 13, a state in which the connection end part 51' of the first electrode layer 50 is seated in the connection space 113 and is electrically connected to the module terminal 120 can be seen. More specifically, the module terminal 120 may be located on the bottom of the connection space 113, and the filter body 10 may be seated on the module terminal, and the first electrode layer 50, the filtering layer 30, and the second electrode layer 70 may be sequentially laminated thereon. Accordingly, the first electrode layer 50 may be electrically connected to the module terminal 120.

In this case, the remaining part of the filter body 10, more precisely, the peripheral part of the connection end part 51' of the first electrode layer 50 may be covered between the first housing 110 and the second housing 130 so as to be insulated. Particularly, the connection end part 70' of the second electrode layer 70 may be located between the first housing 110 and the second housing 130 and may be pressed between the first insulation surface 112 and the second insulation surface 132.

In this case, the conductive paste 140 may be present between the module terminal 120 and the connection end part 51' of the first electrode layer 50. That is, the conductive paste 140 may be applied to a position between the module terminal 120 and the connection end part 51' of the first electrode layer 50 and thus the module terminal 120 and the first electrode layer 50 may be electrically connected to each other. In FIG. 13, the conductive paste 140 can be seen to have a thin layer. Of course, the conductive paste 140 may not be necessarily applied but may be sprayed, or solidified materials thereof may be stacked to be inserted into the position between the module terminal and the connection end part.

Generally, the conductive paste 140 is a composite material in which functional fillers such as metal powder or inorganic oxide are uniformly dispersed in a resin solution having fluidity, and is manufactured by dispersing metal particles with a diameter of several hundred to several thousand nanometers to an adhesive resin. Accordingly, the conductive paste 140 may function as an adhesive coupling the module terminal 120 to the connection end part 51' of the first electrode layer 50, and may function to electrically connect the module terminal 120 with the connection end part 51'.

Of course, without using the conductive paste 140, the module terminal 120 and the connection end part 51' of the first electrode layer 50 may be in close contact with each other only by the press block 135 of the second housing 130, and may be coupled to each other by a method such as laser welding.

Referring to FIG. 13, the connection end part 51' of the first electrode layer 50 may be located in the connection space 113, but a connection end part which is the conductor of the second electrode layer 70 may be located at a position away from the connection space 113. That is, a portion of an end part of the second electrode layer 70 may be located between the first insulation surface 112 and the second insulation surface 132. Furthermore, the connection end part 51' of the first electrode layer 50 and the connection end part 70' of the second electrode layer 70 may be spaced apart from each other to naturally form an insulation section therebetween.

Referring to FIG. 13, the connection end part 51' of the first electrode layer 50 and the connection end part 70' of the second electrode layer 70 may have different heights from each other and may have different positions in left and right directions, respectively, so a stable insulation therebetween may be realized. Furthermore, the connection end part 51' of the first electrode layer 50 may be considered to be blocked from the connection end part 70' of the second electrode layer 70 by the press block 135.

A step may be made since lengths of the first electrode layer 50 and the second electrode layer 70 are different from each other. That is, the lengths of end parts of the first electrode layer 50 and the second electrode layer 70 may be different from each other, and thus the insulation step part A may be formed between the first electrode layer 50 and the second electrode layer 70. The insulation step part A may be naturally made since the lengths of the first electrode layer 50 and the second electrode layer 70 are different from each other. Alternatively, when the lengths of the first electrode layer 50 and the second electrode layer 70 are the same but only the connection end part 51' of the first electrode layer 50 is placed in the connection space 113, the insulation step part A may be made.

Due to such an insulation step part A, the connection end part 51' of the first electrode layer 50 may be seated in the connection space 113 and be connected to the module terminal 120, and the connection end part 70' of the conductor of the second electrode layer 70 which has a shorter length may be located at a position away from the connection space 113 and may be covered by the module housing 110 or 130.

Referring to FIG. 14, the second connection module 100' is configured in a direction opposite to the direction of FIG. 13. That is, the connection end part 70' of the second electrode layer 70 may be located in the connection space 113, but the connection end part 51' which is the conductor of the first electrode layer 50 may be located at a position away from the connection space 113. That is, a portion of the end part of the first electrode layer 50 may be located between the first insulation surface 112 and the second insulation surface 132. Furthermore, the connection end part 51' of the first electrode layer 50 and the connection end part 70' of the second electrode layer 70 may be spaced apart from each other to naturally form the insulation step part A.

In FIG. 14, a reference numeral 58 is an insulated end part made on the connection end part 51' of the first electrode layer 50. For reliable insulation, the insulated end part 58 is insulated by covering the connection end part 51' of the first electrode layer 50. For example, the connection end part 51' of the first electrode layer 50 may be covered with an insulating tape so as to be insulated from a surrounding area.

Referring to FIGS. 8 and 9, the first connection module 100 and the second connection module 100' may be coupled to the opposite sides of the filter body 10, respectively. Furthermore, the first terminal head 125 protruding from the first connection module 100 and the second terminal head 125' protruding from the second connection module 100' may protrude in directions opposite to each other. Accordingly, an insulation distance between the first connection module 100 and the second connection module 100' may increase, and consequently, current may not easily flow between the first connection module 100 and the second connection module 100'.

In the embodiment described above, the module housing 110 or 130 includes the first housing 110 and the second housing 130. However, the module housing 110 or 130 may be configured as one body, and in this case, the second housing 130 may be omitted, or the first housing 110 and the second housing 130 may be connected integrally to each other by an injection hinge. Without the second housing 130, the module terminal 120 of the connection space 113 may be exposed to the outside, but remaining parts may be surrounded by insulating materials, and may secure some degree of insulation.

In the above, all the components according to the embodiments of the present disclosure are described as being coupled to each other as one or being operated in the coupled state, but the present disclosure is not necessarily limited to the embodiments. That is, if it is within the scope of the present disclosure, at least one of all of the components may be selectively combined and operated. In addition, the terms such as "include", "compose", or "have" as described above means that the corresponding components can be inherent unless specifically stated to the contrary. Accordingly, it should be interpreted that other components are not excluded, but may further be included. All terms, including technical or scientific terms, have the same meaning as generally understood by those skilled in the art to which the present disclosure belongs, unless otherwise defined. Commonly used terms, such as predefined terms, should be interpreted as being consistent with the contextual meaning of the related art, and are not to be interpreted as ideal or excessively formal meanings unless explicitly defined in the present disclosure.

The above description is only to illustrate the technical idea of the present invention, but those skilled in the art to which the present invention pertains will be able to make various modifications and variations without departing from the essential characteristics of the present invention. Accordingly, the embodiments disclosed in the present invention is not intended to limit the technical spirit of the present invention, but to explain it, and the scope of the technical spirit of the present invention is not limited to the embodiments. The scope of protection of the present invention should be interpreted by the scope of the claims below, and all technical spirits within the scope equivalent thereto should be interpreted as being included in the scope of the claims of the present invention.

The invention claimed is:

1. An air purification filter comprising:
a filtering layer configured as a dielectric;
a pair of electrode layers provided at opposite sides of the filtering layer, respectively, and configured to receive power so as to generate an electric field in the filtering layer; and
a connection module including:
a coupled portion that is coupled to at least one of the pair of electrode layers and is insulated from an outside of the connection module, and
a module terminal that electrically connects the coupled portion of the connection module with a power supply,
wherein the connection module includes a module housing that comprises a first housing having a connection space, and a second housing configured to cover the connection space when coupled to the first housing and at least one of the pair of electrode layers is inserted into the connection space and is electrically connected to the module terminal.

2. The filter of claim 1,
wherein at least one of the pair of electrode layers has a connection end that is electrically connected to the power supply, and the connection module is coupled to the at least one of the pair of electrode layers so as to cover the connection end.

3. The filter of claim 1, wherein
the pair of electrode layers comprises:
a first electrode layer laminated on a first side of the filtering layer and comprising a conductive material to which power of a first polarity is applied, and
a second electrode layer laminated on a second side of the filtering layer opposite to the first side of the filtering layer and comprising a conductive material that is grounded or to which power of a second polarity, opposite to the first polarity applied to the first electrode layer, is applied, and
the module terminal of the connection module is electrically connected to at least one of the first electrode layer or the second electrode layer.

4. The filter of claim 1,
wherein the connection module is made of an insulating material, the module terminal being installed in the connection space of the module housing and a terminal head of the module terminal protruding toward an outer side of the connection space and being electrically connected to the power supply.

5. The filter of claim 4,
wherein conductive paste is provided between the module terminal seated in the connection space of the module housing and a connection end of at least one of the pair of electrode layers such that the module terminal and the at least one of the pair of electrode layers are electrically connected to each other.

6. The filter of claim 1,
wherein a first connection end of a conductor of a first electrode layer of the pair of electrode layers is seated in the connection space and is electrically connected to the module terminal, and a second connection end of a conductor of a second electrode layer of the pair of electrode layers is located away from the connection space.

7. The filter of claim 6,
wherein a terminal hole is formed through the module housing, and a terminal head connected to the module terminal protrudes through the terminal hole to extend outside of the module housing.

8. The filter of claim 1,
wherein lengths of the pair of electrode layers are different from each other such that an insulation step is provided between the pair of electrode layers, a connection end of a first conductor of a longer electrode layer of the pair of electrode layers is seated in the connection space of the module housing and is connected to the module terminal, and a connection end of a second conductor of a shorter electrode layer of the pair of electrode layers is located outside the connection space and is covered by the module housing, and
wherein the module terminal is seated on a surface of the connection space defined in the module housing, and the connection end of the first conductor of the longer electrode layer is provided on a surface of the module terminal.

9. The filter of claim 1,
wherein the module terminal is seated in the connection space, the second housing has a press block that protrudes from the second housing in a direction toward the connection space, and the first housing and the second housing are coupled with each other such that the module terminal and a connection end of the at least one of the pair of electrode layers extending in the connection space are pressed by the press block.

10. The filter of claim 1,
wherein the connection module comprises a first connection module and a second connection module coupled respectively to opposite sides of a filter body composed of the filtering layer and the pair of electrode layers,
wherein the first connection module and the second connection module are electrically connected respectively to a first electrode layer and a second electrode layer of the pair of electrode layers,
wherein the first connection module and the second connection module are coupled to the opposite sides of the filter body, a first terminal head protrudes from the first connection module, a second terminal head protrudes from the second connection module, and the first terminal head and the second terminal heads protrude, respectively, in opposite directions and
wherein the filter body is rolled to have a cylindrical shape, and the first connection module and the second connection module are coupled to each other.

11. The filter of claim 1,
wherein at least one of the pair of electrode layers comprises multiple strands of insulated wires without support lines formed of an insulating material or the multiple strands of insulated wires and multiple strands of the support lines that are woven together.

12. The filter of claim 11,
wherein the connection module is coupled to connection ends of the multiple strands of insulated wires, and the module terminal installed in the connection module is electrically coupled to the connection ends.

13. An air purifier comprising:
a purifier housing having a filter installation space defined therein;
a power supply installed on the purifier housing; and
a filter configured to receive power from the power supply when installed in the filter installation space,
wherein the filter comprises:
a filtering layer configured as a dielectric;
a pair of electrode layers provided on opposite sides of the filtering layer, respectively, and configured to receive power from the power supply so as to generate an electric field in the filtering layer; and
a connection module including a region that is coupled to at least one of the pair of electrode layers and is insulated from an outside of the connection module, the connection module having a module terminal installed therein that electrically connects the portion of the connection module coupled to the at least one of the pair of electrode layers with the power supply, and
wherein the connection module includes a module housing that comprises a first housing having a connection space, and a second housing configured to cover the connection space when coupled to the first housing, and at least one of the pair of electrode layers is inserted into the connection space and is electrically connected to the module terminal.

14. The air purifier of claim 13,
wherein the connection module comprises a first connection module and a second connection module coupled respectively to opposite sides of a filter body composed of the filtering layer and the pair of electrode layers, and
wherein the first connection module and the second connection module are electrically connected respectively to a first electrode layer and a second electrode layer included in the pair of electrode layers.

15. The air purifier of claim 13,
wherein the pair of electrode layers have different lengths from each other such that an insulation step is provided between the pair of electrode layers, and a connection end of a longer electrode layer of the pair of electrode layers is seated in the connection space of the connection module so as to be connected to the module terminal, and a connection end of a shorter electrode layer of the pair of electrode layers is located outside the connection space and is covered by the module housing of the connection module.

16. The air purifier of claim 14,
wherein a first connection terminal which is electrically connected to the power supply to receive power of a first polarity, and a second connection terminal which is electrically connected to the power supply to receive power of a second polarity opposite to the first polarity of the first connection terminal or is grounded are installed in the filter installation space, and when the filter is installed in the filter installation space, the first connection module and the second connection module are electrically connected to the second connection terminal and the first connection terminal, respectively, and
wherein a first module terminal of the first connection module and a second module terminal of the second connection module protrude in directions opposite to each other, and the first connection terminal and the second connection terminal are installed at positions having different heights so as to correspond to heights of the first module terminal and the second module terminal.

17. The air purifier of claim 16,
wherein the filter body is rolled such that the filter has a cylindrical shape, and at least one of the first connection terminal or the second connection terminal is provided along a virtual circular extension line drawn while a terminal head of the module terminal protruding from the connection module rotates relative to a center axis of the cylindrical shaped filter.

18. The air purifier of claim 16,
wherein a first terminal head of the first connection module of the filter and a second terminal head of the second connection module thereof protrude in directions opposite to each other, and the first connection terminal and the second connection terminal respectively extend to have circular shapes to be spaced apart from each other and corresponding to heights of the first connection module and the second connection module.

19. The air purifier of claim 16,
wherein the filter has a structure of a flat plate extending in one direction and has the first connection module and the second connection module provided respectively on opposite ends of the filter body, and the first connection terminal and the second connection terminal are respectively located at positions corresponding to a second terminal head of the second connection module and a first terminal head of the first connection module, and wherein the first connection terminal comprises a pair of first connection terminals having different heights or having different positions in left and right directions, respectively, and the second connection terminal comprises a pair of second connection terminals having different heights or having different positions in left and right directions, respectively.

20. The air purifier of claim 14, wherein at least one electrode layer of the pair of electrode layers includes strands of insulated wires and strands of support lines which are insulators, the strands of insulated wires and the strands of support lines being interlaced, and wherein the connection module is coupled to connection ends of conductive cores included in the strands of insulated wires, and the module terminal of the connection module is electrically coupled simultaneously to the connection ends.

* * * * *